(12) United States Patent
Shinoda et al.

(10) Patent No.: US 12,527,538 B2
(45) Date of Patent: Jan. 20, 2026

(54) X-RAY IMAGING APPARATUS, MEDICAL DATA PROCESSING APPARATUS AND NON-TRANSITORY COMPUTER MEDIUM STORING COMPUTER PROGRAM

(71) Applicant: CANON MEDICAL SYSTEMS CORPORATION, Otawara (JP)

(72) Inventors: Katsuaki Shinoda, Shioya (JP); Keisuke Sugawara, Otawara (JP); Mitsunobu Sugeno, Utsunomiya (JP); Satoshi Tanaka, Nasushiobara (JP); Mitsuru Sakata, Yaita (JP); Takayuki Ishikawa, Nasushiobara (JP); Satoshi Yamashita, Utsunomiya (JP); Yosuke Kayukawa, Otawara (JP); Ko Fuchigami, Otawara (JP); Hirona Oikawa, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 179 days.

(21) Appl. No.: 18/305,441

(22) Filed: Apr. 24, 2023

(65) Prior Publication Data
US 2023/0346333 A1 Nov. 2, 2023

(30) Foreign Application Priority Data
Apr. 27, 2022 (JP) .................. 2022-073437

(51) Int. Cl.
*A61B 6/42* (2024.01)
*A61B 6/00* (2006.01)
(Continued)

(52) U.S. Cl.
CPC ............ *A61B 6/542* (2013.01); *A61B 6/4208* (2013.01); *A61B 6/462* (2013.01); *G06T 5/50* (2013.01);
(Continued)

(58) Field of Classification Search
CPC ....... A61B 6/542; A61B 6/4208; A61B 6/462; A61B 6/4441; A61B 6/461; G06T 5/50;
(Continued)

(56) References Cited

U.S. PATENT DOCUMENTS 11,160,995 B2 * 11/2021 Pigott .................. A61N 5/1075
2013/0135468 A1 * 5/2013 Kim ..................... G06V 10/143
348/143

(Continued)

FOREIGN PATENT DOCUMENTS

JP 2015213671 A * 12/2015

OTHER PUBLICATIONS

Translation of JP2015213671A (Year: 2015).*

(Continued)

*Primary Examiner* — David P Porta
*Assistant Examiner* — Mamadou Faye
(74) *Attorney, Agent, or Firm* — Oblon, McClelland, Maier & Neustadt, L.L.P.

(57) ABSTRACT

The X-ray imaging apparatus according to the embodiment includes an X-ray irradiator and processing circuitry. The X-ray irradiator is placed in a surgery room. The processing circuitry is configured to sequentially acquire a position of each staff member presenting in the surgery room during a procedure using the X-ray irradiator. The processing circuitry is configured to sequentially acquire an exposure dose of each staff member from a dosimeter. The processing circuitry is configured to associate the position of each staff member and the exposure dose of each staff member with a time, and sequentially record association data in a memory circuit. The processing circuitry is configured to display association data indicating a relation between the position of each staff member and the exposure dose of each staff member in an identifiable manner on a display.

19 Claims, 14 Drawing Sheets

(51) Int. Cl.
  *A61B 6/46* (2024.01)
  *G06T 5/50* (2006.01)
  *G06T 7/00* (2017.01)
  *G06V 10/764* (2022.01)

(52) U.S. Cl.
  CPC .......... *G06T 7/0012* (2013.01); *G06V 10/764* (2022.01); *G06T 2207/10116* (2013.01); *G06T 2207/20221* (2013.01)

(58) Field of Classification Search
  CPC .......... G06T 7/0012; G06T 2207/10116; G06T 2207/20221; G06T 11/00; G06V 10/25; G06V 10/764; G06V 2201/03
  See application file for complete search history.

(56) References Cited

U.S. PATENT DOCUMENTS

2017/0319155 A1\* 11/2017 Rubenstein ............ A61B 6/107
2021/0383916 A1\* 12/2021 Pillarisetty ............. A61B 6/542

OTHER PUBLICATIONS

Fisher et al. "Evaluation of real-time location systems in their hospital contexts", Center for Biomedical Ethics & Society, Vanderbilt University, Elsevier Ireland Ltd, 2012, p. 705-711.\*

Anna et al. "Occupational Radiation Exposure During Endovascular Aortic Repair", Springer, Cardiovasc Intervent Radiol (2015) 38; p. 827-832 (Year: 2015).\*

\* cited by examiner

FACE DATA TABLE
| STAFF MEMBER M | FACE DATA |
|---|---|
| FIRST STAFF MEMBER m1 | 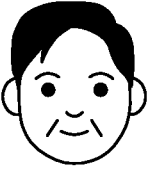 |
| ⋮ | ⋮ |
| SIXTH STAFF MEMBER m6 |  |
FIG. 6
DOSIMETER TABLE
| STAFF MEMBER M | IDENTIFICATION DATA OF DOSIMETER D |
|---|---|
| FIRST STAFF MEMBER m1 | d1 |
| ⋮ | ⋮ |
| SIXTH STAFF MEMBER m6 | d6 |
FIG. 7

POSITION TABLE

| STAFF MEMBER M | IDENTIFICATION DATA OF POSITION CENSER P |
|---|---|
| FIRST STAFF MEMBER m1 | p1 |
| ⋮ | ⋮ |
| SIXTH STAFF MEMBER m6 | p6 |

```
Log1
・IMAGING MODE : CARDIAC
・X-RAY IRRADIATION CONDITION
・・X-RAY FOCAL POSITION : [X,Y,Z]
・・X-RAY IRRADIATION ANGLE : CRA○○° 、LA0○○°
・・FLUOROSCOPY IMAGING CONDITION :
     FLUOROSCOPY IMAGING UNDER 85kV, 200mA AND 7msec FOR 10 SECONDS
・・RADIOGRAPHY IMAGING CONDITION :
     RADIOGRAPHY IMAGING UNDER 90kV, 250mA AND 8msec FOR 2 SECONDS
Log2
          ⋮
```

X-RAY IMAGING APPARATUS, MEDICAL DATA PROCESSING APPARATUS AND NON-TRANSITORY COMPUTER MEDIUM STORING COMPUTER PROGRAM

CROSS-REFERENCE TO RELATED APPLICATION

This application is based upon and claims the benefit of priority from Japanese Patent Application No. 2022-073437, filed on Apr. 27, 2022, the entire contents of which are incorporated herein by reference.

FIELD

Disclosed embodiments relate to an X-ray imaging apparatus, a medical data processing apparatus and a non-transitory computer medium storing computer program.

BACKGROUND

In recent years, examination using an X-ray imaging apparatus has become widespread. The inside of a surgery room where IVR (Interventional Radiology), which is catheterization under fluoroscopy imaging, is defined as an area where people always enter. The shielding standard is stipulated by the Enforcement Regulations on the Medical Care Act. X-rays are being irradiated in the surgery room during fluoroscopy imaging and radiography imaging, and a radiation field and air dose exist. The radiation level varies in different areas in the surgery room.

In surgeries using the X-ray imaging apparatus, efforts are being made to reduce the radiation exposure of each medical staff member in the surgery room. However, there is a problem that there is no mechanism that shows the exposure dose corresponding to a position of each medical staff member in the surgery room.

Figure 5A:
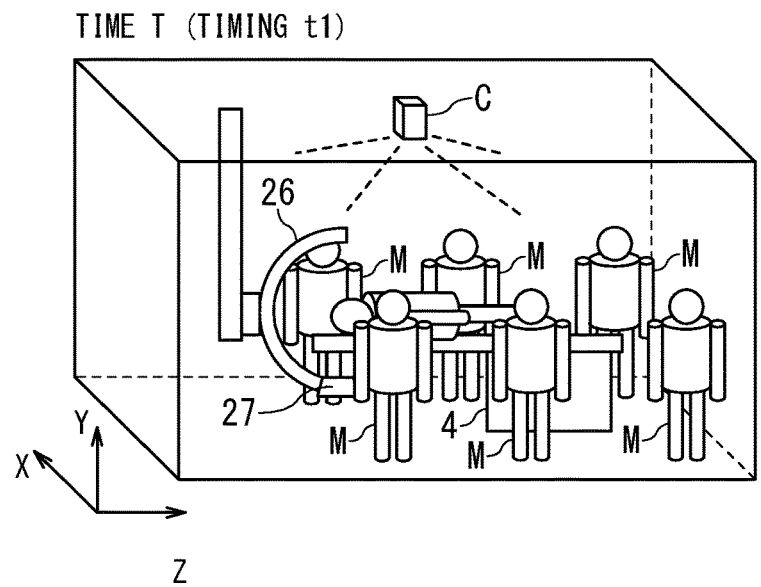
FIG. 5A is a diagram showing an example of a state where six staff members are present in the surgery room where the X-ray imaging apparatus is provided according to the embodiment.
Figure 5B:
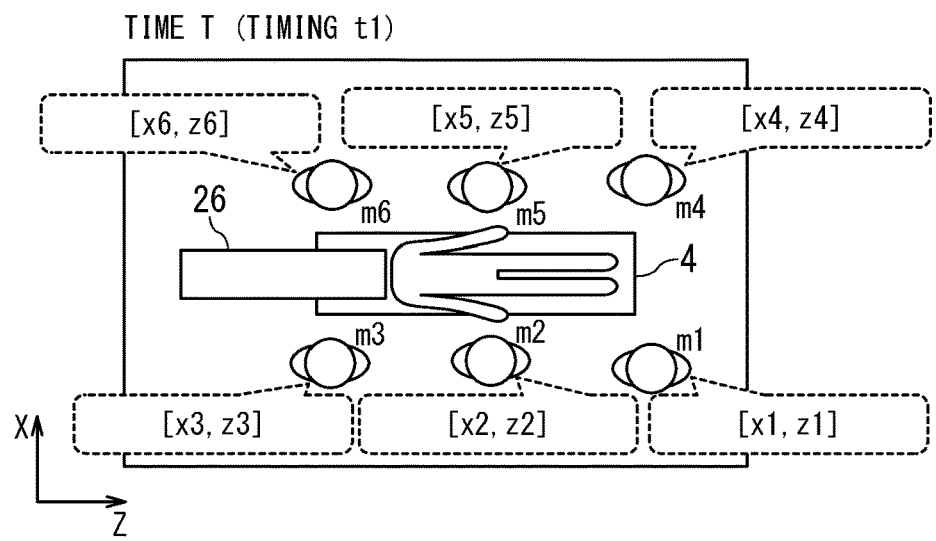
Figure 5C:
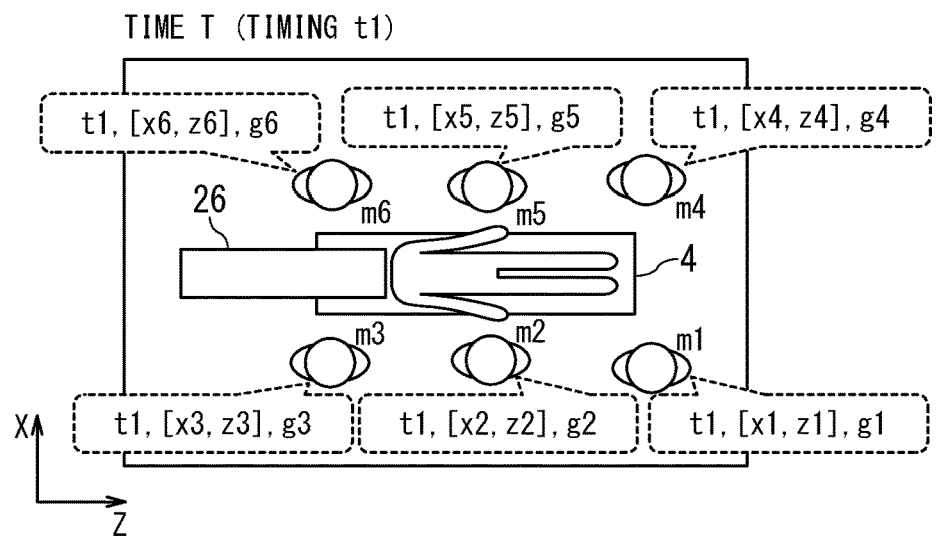

Each of FIGS. 5B and 5C is a diagram showing an optical image acquired by the optical camera in the state shown in FIG. 5A.

FIG. 6 is a diagram showing a face data table in which a staff member is associated with face data of the staff member in the X-ray imaging apparatus according to the embodiment.

FIG. 7 is a diagram showing a dosimeter table in which a staff member is associated with identification data of a dosimeter carried by the staff member in the X-ray imaging apparatus according to the embodiment.

Figure 8A:
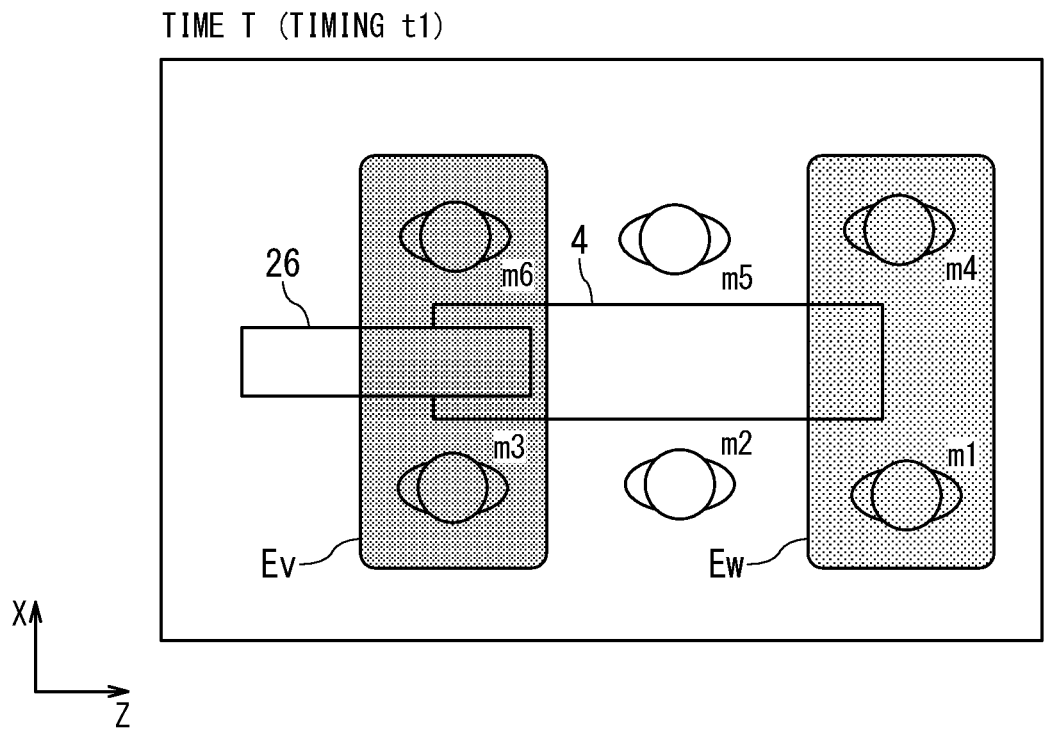
Figure 8B:
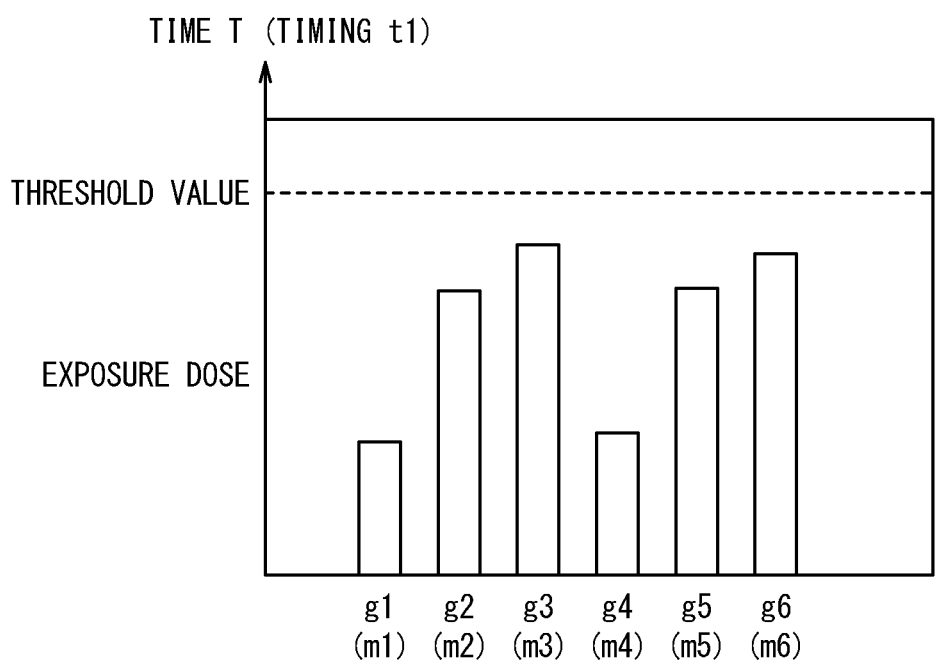

Each of FIGS. 8A and 8B is a diagram showing a display example of association data indicating a relation between the position of each staff member and the exposure dose of each staff member in the X-ray imaging apparatus according to the embodiment.

Figure 9A:
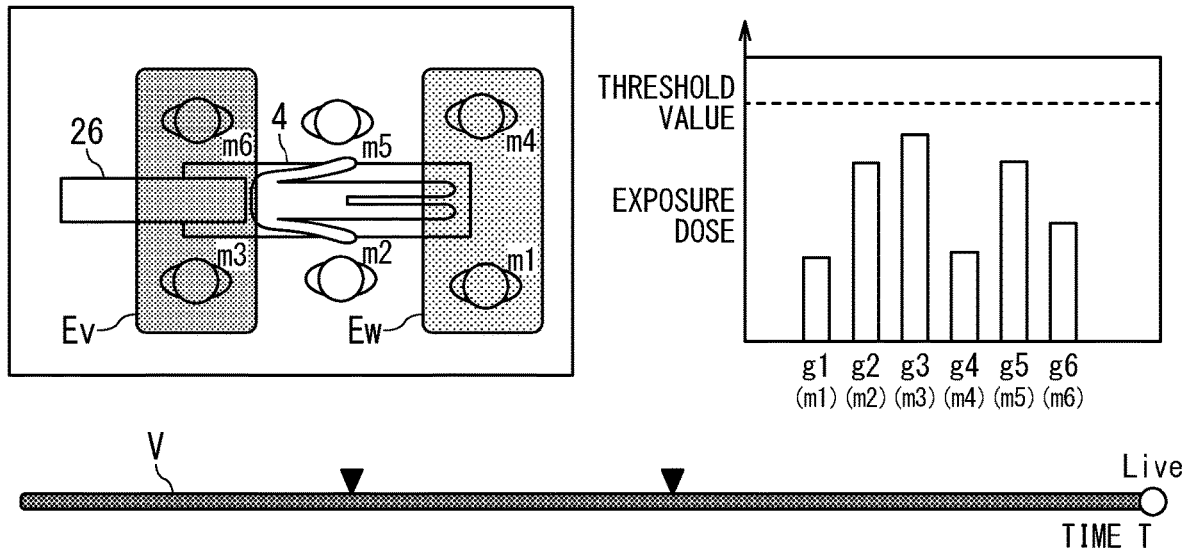
Figure 9B:
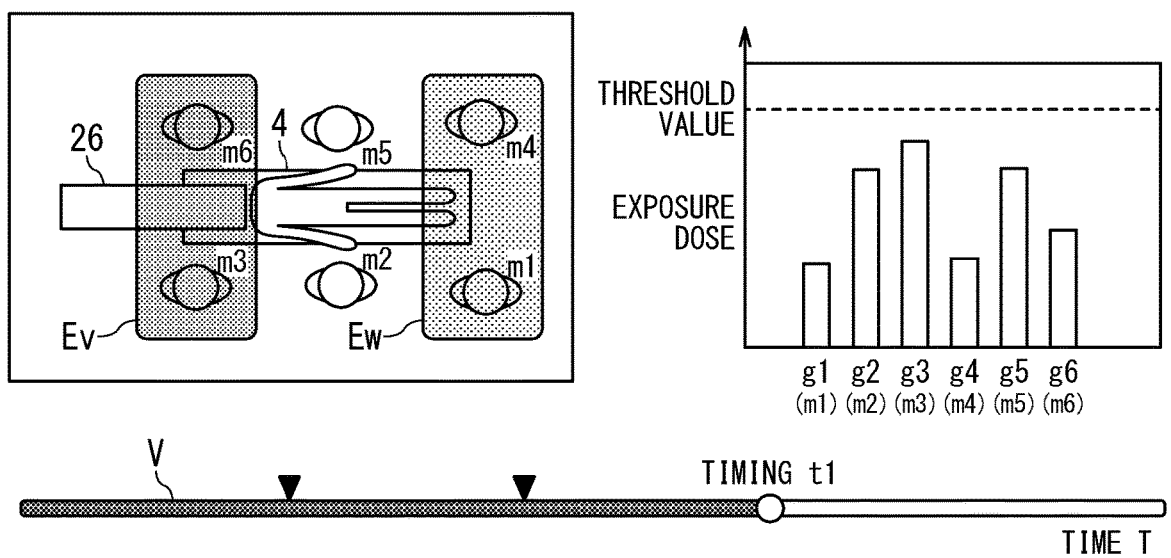

Each of FIGS. 9A and 9B is a diagram showing a display example of association data indicating a relation between the position of each staff member and the exposure dose of each staff member in the X-ray imaging apparatus according to the embodiment.

Figure 10:
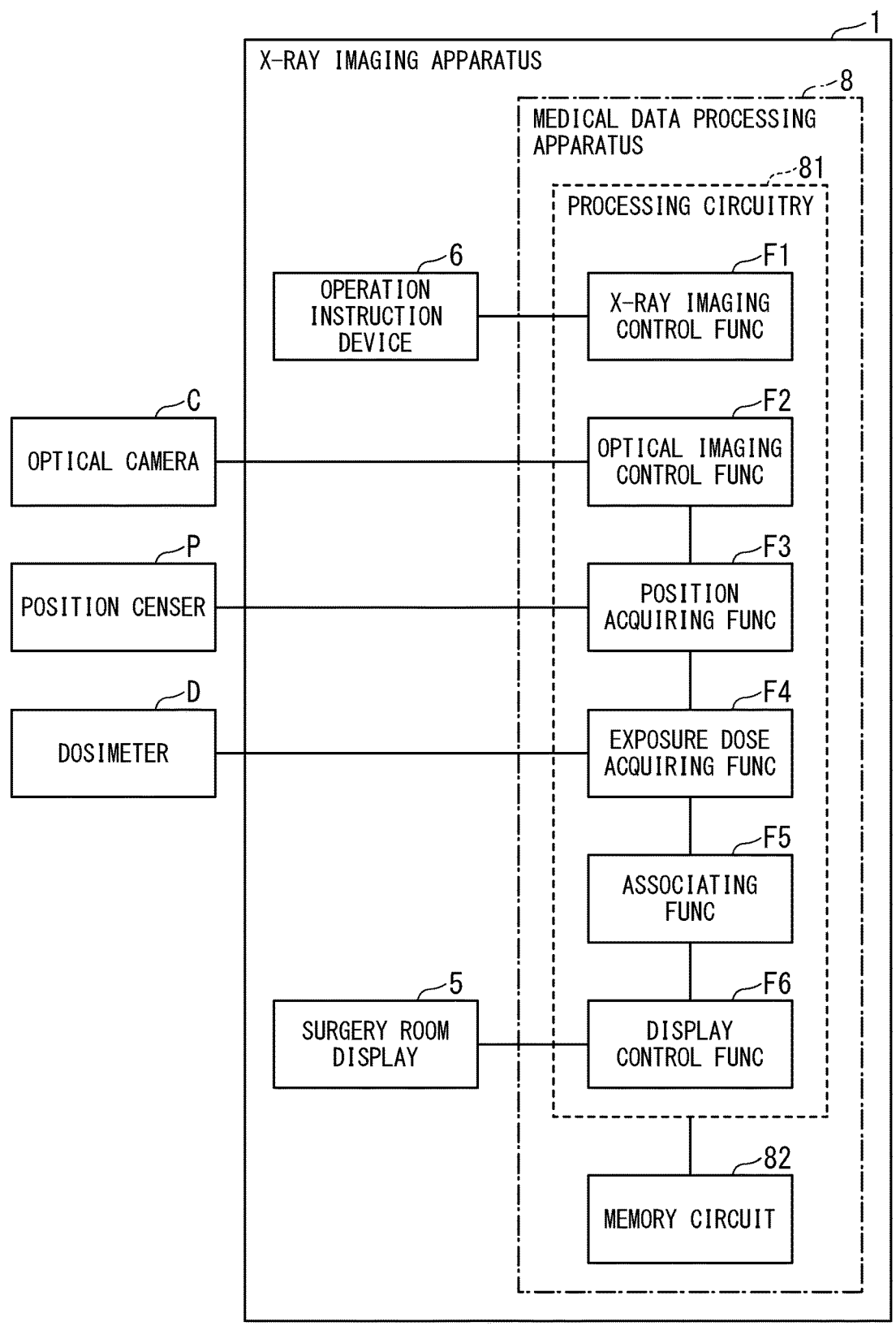

FIG. 10 is a block diagram showing functions of the first modification of the X-ray imaging apparatus according to the embodiment.

Figures 11, 12:
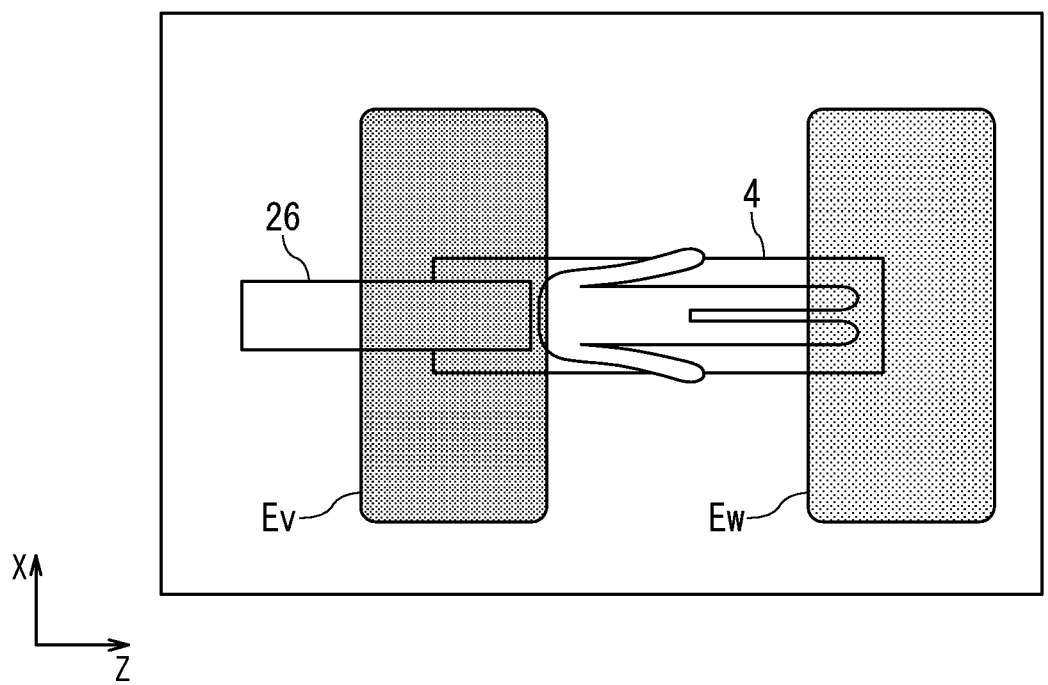

FIG. 11 is a diagram showing a position table in which a staff member is associated with identification data of a position sensor carried by oneself in the first modification of the X-ray imaging apparatus according to the embodiment.

FIG. 12 is a diagram showing a display example of association data indicating a relation between the position of each staff member and the exposure dose of each staff member in the first modification of the X-ray imaging apparatus according to the embodiment.

Figure 13A:
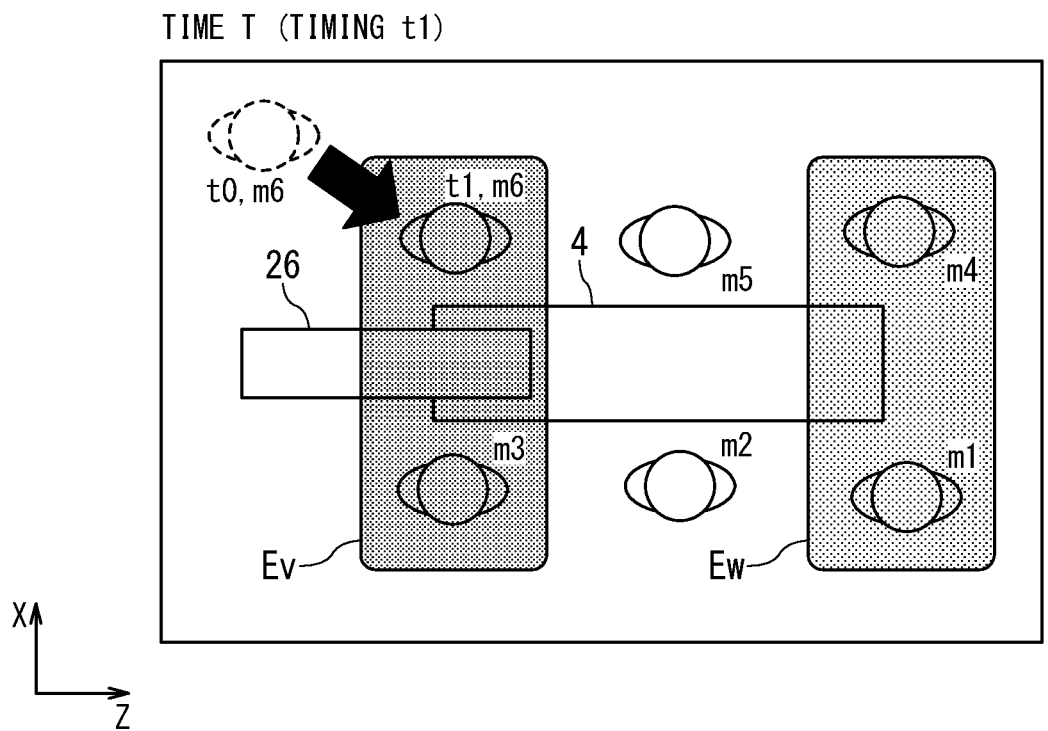

FIG. 13A is a diagram showing a motion of a staff member from timing t0 to timing t1 in the first modification of the X-ray imaging apparatus according to the embodiment.

Figure 13B:
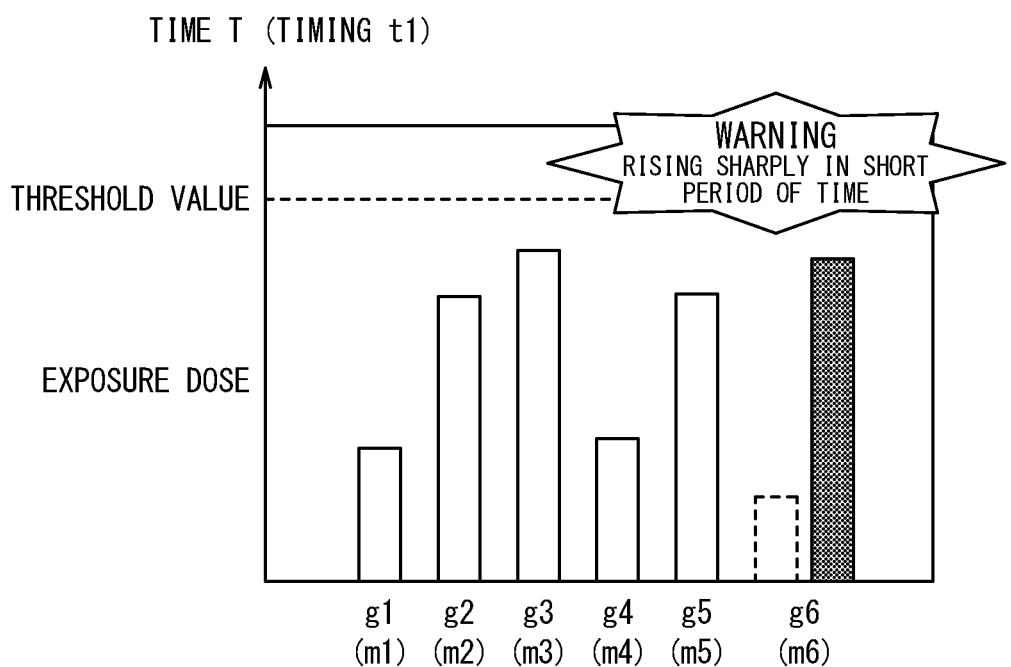

FIG. 13B is a diagram showing a warning display example in the first modification of the X-ray imaging apparatus according to the embodiment.

Figures 14, 15:
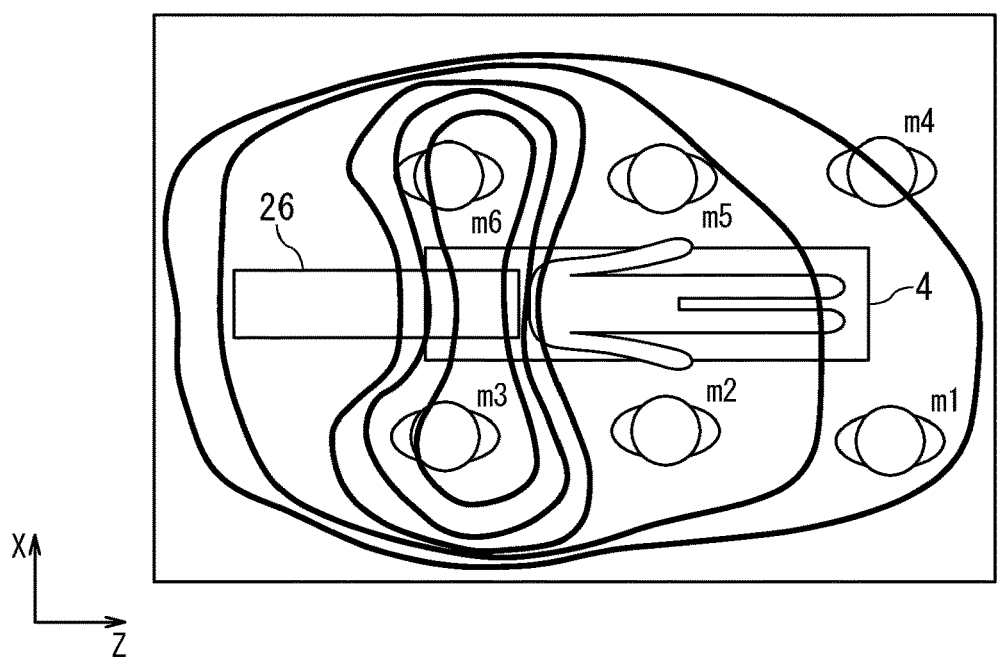

FIG. 14 is a diagram showing a history of irradiation data in the third modification of the X-ray imaging apparatus according to the embodiment.

FIG. 15 is a diagram showing a display example of association data indicating a relation between the position of each staff member and the exposure dose of each staff member in the third modification of the X-ray imaging apparatus according to the embodiment.

Figure 16:
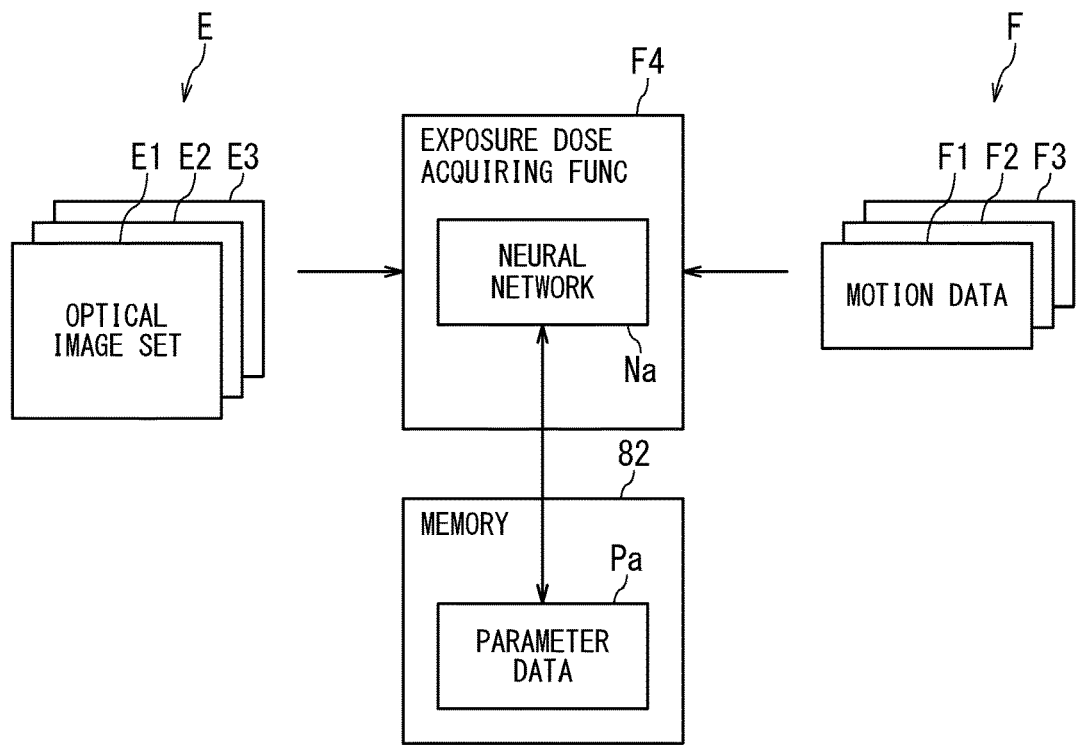

FIG. 16 is an explanatory diagram showing an example of data flow during learning in the fourth modification of the X-ray imaging apparatus according to the embodiment.

Figure 17:
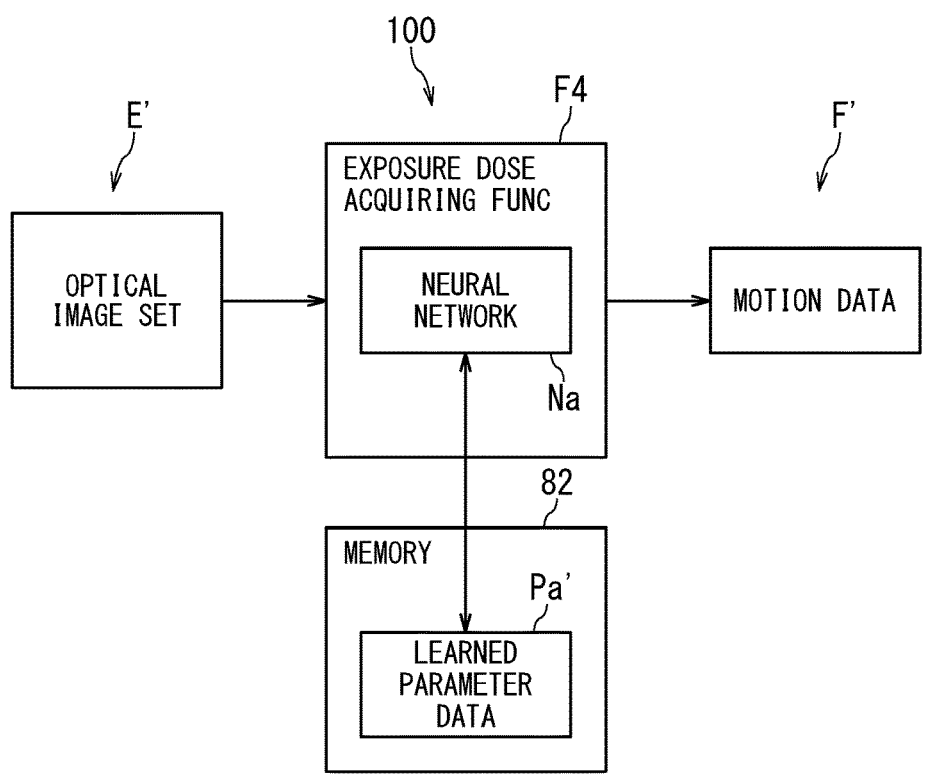

FIG. 17 is an explanatory diagram showing an example of data flow during operation in the fourth modification of the X-ray imaging apparatus according to the embodiment.

Figure 18:
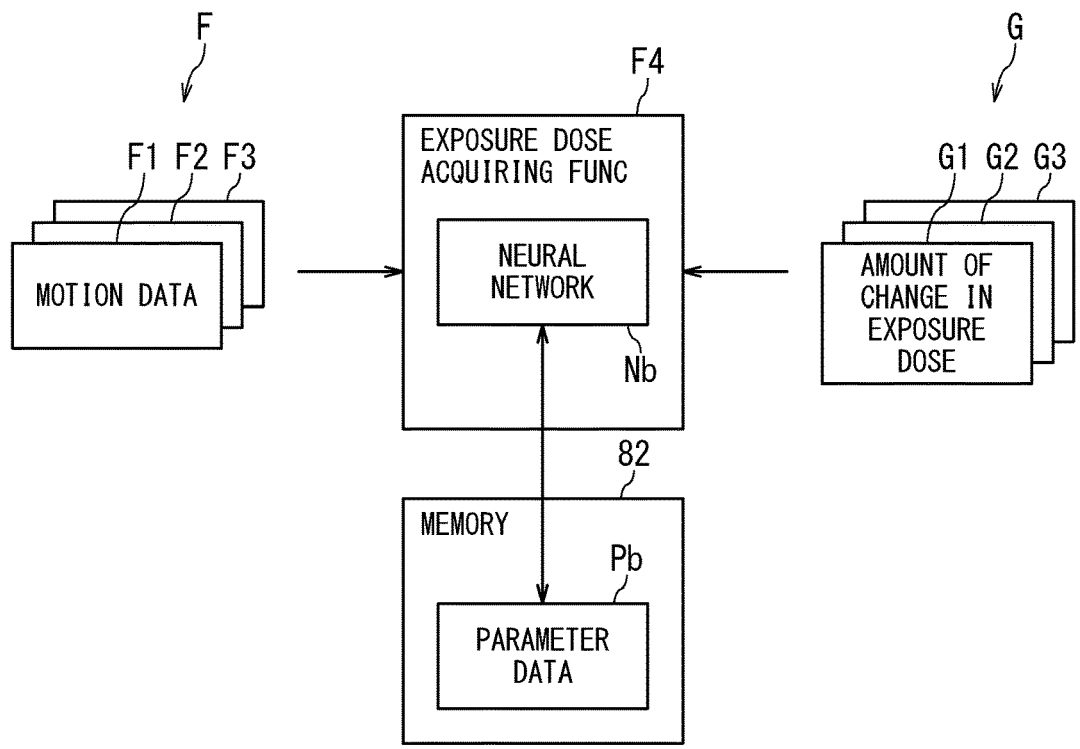

FIG. 18 is an explanatory diagram showing an example of data flow during learning in the fourth modification of the X-ray imaging apparatus according to the embodiment.

Figure 19:
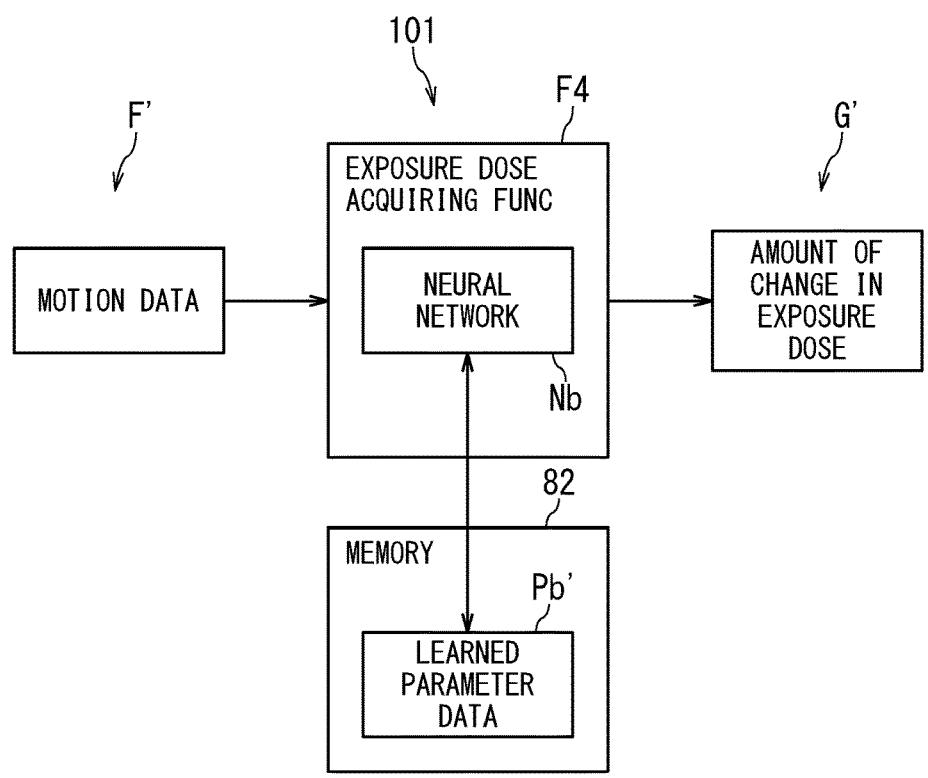

FIG. 19 is an explanatory diagram showing an example of data flow during operation in the fourth modification of the X-ray imaging apparatus according to the embodiment.

DETAILED DESCRIPTION

An X-ray imaging apparatus, a medical data processing apparatus and a non-transitory computer medium storing computer program according to any of embodiments will be described with reference to the accompanying drawings.

The X-ray imaging apparatus according to the embodiment includes an X-ray irradiator and processing circuitry. The X-ray irradiator is placed in a surgery room. The processing circuitry is configured to sequentially acquire a position of each staff member presenting in the surgery room during a procedure using the X-ray irradiator. The processing circuitry is configured to sequentially acquire an exposure dose of each staff member from a dosimeter. The processing circuitry is configured to associate the position of each staff member and the exposure dose of each staff member with time, and sequentially record association data in a memory circuit. The processing circuitry is configured to display association data indicating a relation between the position of each staff member and the exposure dose of each staff member in an identifiable manner on a display.

The X-ray imaging apparatus according to an embodiment refers to an apparatus that performs X-ray imaging in an surgery room in which multiple medical staff member (hereinafter simply referred to as "staff member") are present in the surgery room for performing a surgical operation on a subject. Examples of the X-ray imaging apparatus include an X-ray apparatus and an X-ray CT (Computed Tomography) apparatus. The X-ray apparatuses include X-ray cardiography apparatuses (also called "X-ray angio apparatuses"), X-ray TV apparatuses, and the like. With the X-ray CT apparatus, IVR can be performed under CT fluoroscopy imaging while the staff member is present in the surgery room.

Here, X-ray imaging is roughly classified into "radiography imaging" and "fluoroscopy imaging" depending on the X-ray irradiation mode. In "radiography imaging", X-rays are irradiated with a relatively high tube current. On the other hand, in "fluoroscopy imaging", X-rays are irradiated with a relatively low tube current. "Fluoroscopy imaging" is roughly classified into continuous fluoroscopy imaging and pulse fluoroscopy imaging. Unlike continuous fluoroscopy imaging, the pulse fluoroscopy imaging refers to a fluoroscopy mode in which X-ray pulses are intermittently and repeatedly irradiated. The pulse fluoroscopy imaging is slightly inferior to continuous fluoroscopy in terms of image continuity (frame rate), but it can reduce patient exposure dose. In the present invention, "X-ray imaging" shall include at least one of "radiography imaging" and "fluoroscopy imaging".

A case where the X-ray imaging apparatus according to the embodiment is an X-ray cardiography imaging apparatus will be described below, but the present invention is not limited to this case.

Figure 1:
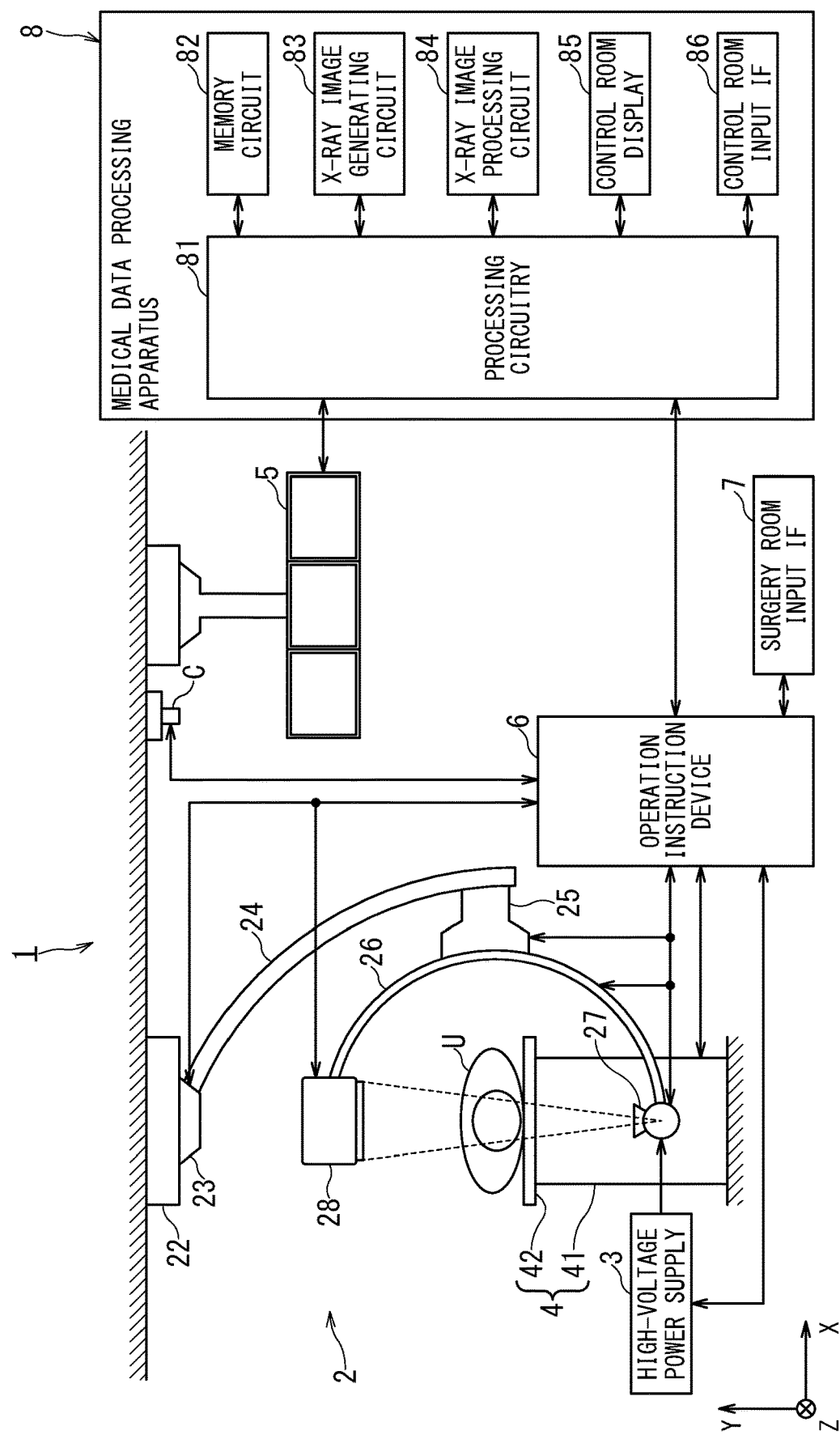
FIG. 1 is a schematic diagram showing an overall configuration of an X-ray imaging apparatus according to an embodiment.
Figure 2:
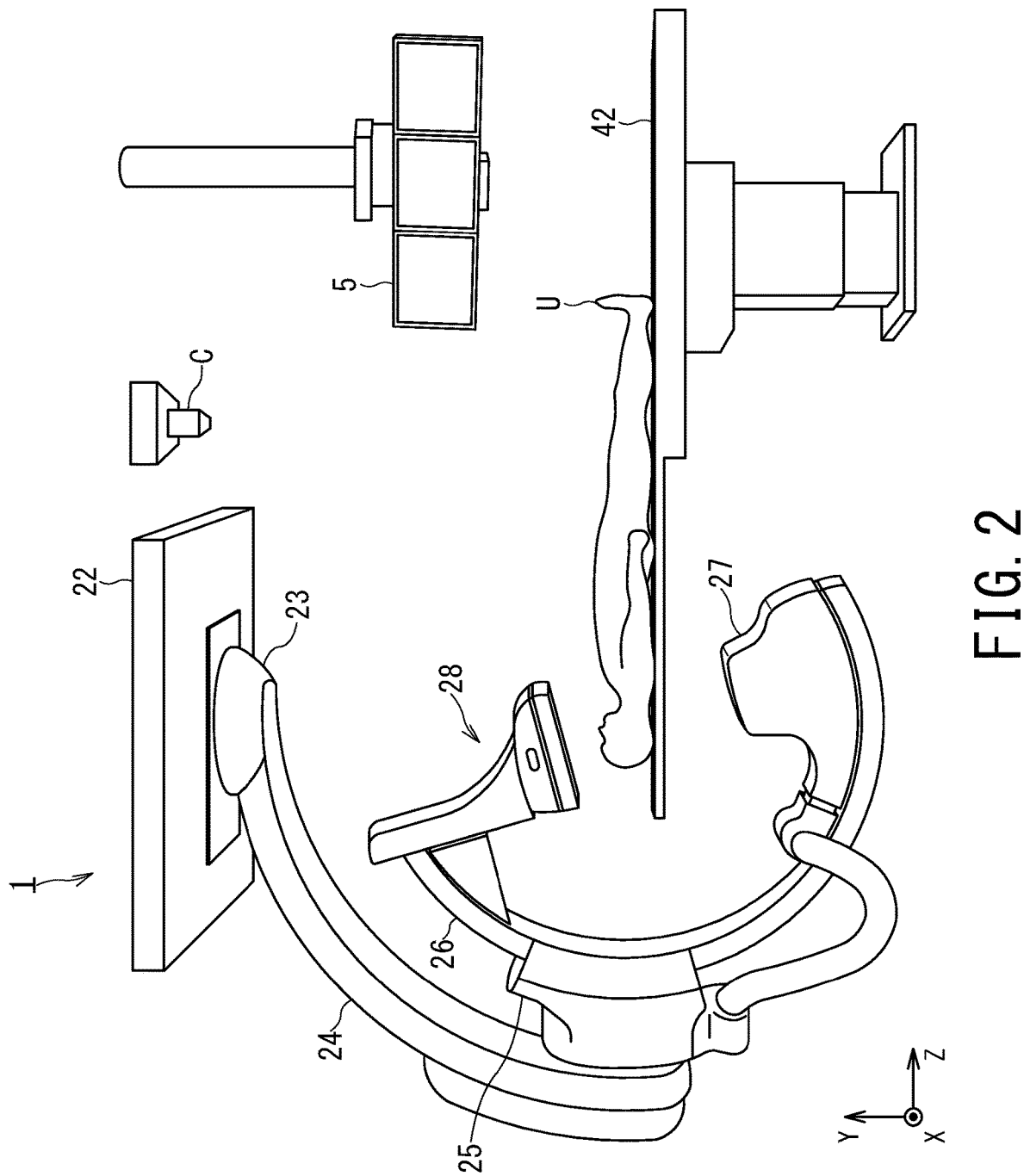
FIG. 2 is a perspective view showing a configuration of the X-ray imaging apparatus inside the surgery room according to the embodiment.

FIG. 1 is a schematic diagram showing an overall configuration of an X-ray imaging apparatus according to an embodiment. FIG. 2 is a perspective view showing a configuration inside the surgery room where the X-ray imaging apparatus is provided according to the embodiment.

FIG. 1 shows an X-ray imaging apparatus 1, an optical camera C, and a dosimeter D (shown in FIG. 3) according to an embodiment. Although FIG. 1 shows a case where the X-ray imaging apparatus 1 is equipped with a C-arm of a ceiling traveling type and an under-tube type, the X-ray imaging apparatus 1 is not limited to this case. The X-ray imaging apparatus 1 may include both a ceiling-traveling Ω-arm and a floor-standing C-arm, or a ceiling-traveling Ω-arm only, or a floor-standing C-arm only. The X-ray imaging apparatus 1 may also include an over-tube type C-arm or Ω-arm.

The X-ray imaging apparatus 1 roughly includes a holder 2, a high-voltage power supply 3, a bed 4, an surgery room display 5, an operation instruction device 6, and a surgery room input interface (hereinafter referred to as "surgery room input IF") 7, a medical data processing apparatus 8 according to the embodiment, and an optical camera C. The holder 2, the high-voltage power supply 3, the bed 4, the surgery room display 5, the operation instruction device 6, the surgery room input IF 7, and the optical camera C are installed in an surgery room (also called "angiography room", "catheterization room", or "examination room") where a subject, for example, a patient U, is subjected to a medical procedure. On the other hand, the medical data processing apparatus 8 is installed in a control room adjacent to the surgery room.

The holder 2 includes a support assembly 22, a vertical axis rotation assembly 23, a suspension arm 24, a C-arm rotation assembly 25, a C-arm 26, an X-ray irradiator 27 and an X-ray detector 28.

The support assembly 22 is held by the ceiling of the surgery room. The vertical axis rotation assembly 23 is rotatably supported by the support assembly 22. The vertical axis rotation assembly 23 can move, that is, rotate in the direction around the vertical axis, under the control of the operation instruction device 6 or by manual operation.

The suspension arm 24 is supported by the vertical axis rotation assembly 23 and can operate integrally with the vertical axis rotation assembly 23.

The C-arm rotation assembly 25 is supported by the suspension arm 24. The C-arm rotation assembly 25 can move, that is, rotate in the direction around the horizontal axis, under the control of the operation instruction device 6 or by manual operation.

The X-ray irradiator 27 and the X-ray detector 28 are arranged to face each other with the patient U inbetween. The C-arm 26 is supported by the C-arm rotation assembly 25. The C-arm 26 can move along a curved rail, that is, perform circular arc motion, under the control of the operation instruction device 6 or by manual operation.

The X-ray irradiator 27 is provided at one end of the C-arm 26. The X-ray irradiator 27 can move along a direction (SID (Source Image Distance) direction) connecting the center of the X-ray tube and the center of the X-ray detector (not shown), that is, move forward and backward, under the control of the operation instruction device 6 or by manual operation.

The X-ray irradiator 27 is provided with an X-ray source (for example, an X-ray tube) (not shown) and a movable diaphragm assembly. The X-ray tube is supplied with high voltage power from the high-voltage power supply 3 and generates X-rays according to the conditions of the high-voltage power. The movable diaphragm assembly movably supports diaphragms each made of a substance capable of shielding X-rays at the X-ray irradiation aperture of the X-ray tube, under the control of the operation instruction device 6. A radiation quality adjustment filter (not shown) for adjusting the radiation quality of X-rays generated by the X-ray tube may be provided on the front surface of the X-ray tube.

The X-ray detector 28 is provided at the other end of the C-arm 26 facing the X-ray irradiator 27. The X-ray detector 28 can move along the SID direction, that is, can move back and forth under the control of the operation instruction device 6 or by manual operation. Further, the X-ray detector 28 can move along the rotation direction centering on the SID direction, that is, can rotate around the SID direction under the control of the operation instruction device 6 or by manual operation.

The X-ray detector 28 includes an FPD (Flat Panel Detector) and an A/D (Analog to Digital) conversion circuit (not shown). The FPD has detection elements arranged two-dimensionally. Between each detection element of the FPD, the scanning lines and the signal lines are arranged so as to be orthogonal to each other. A grid (not shown) may be provided on the front surface of the FPD. The grid is formed by alternately arranging grid plates made of lead or the like, which absorbs X-rays greatly, and aluminum, wood or the like, which easily transmits X-rays. Such grid can improve the contrast of the X-ray image by absorbing the scattered X-rays incident on the FPD. The A/D conversion circuit converts the projection data of time-series analog signal (video signal) output from the FPD into digital signals, and outputs the digital signals to the medical data processing apparatus 8.

Note that the X-ray detector 28 may be an I.I. (Image Intensifier)-TV system. In the I. I.-TV system, X-rays that passed through the patient U and X-rays that entered directly are both converted to visible light. And then in the process of photo-electro-photo conversion, doubling brightness is performed to form sensitive projection data. The optical projection data is then converted into electrical signals using a CCD (Charge Coupled Device) imaging device.

The high-voltage power supply 3 can supply high-voltage power to the X-ray tube of the X-ray irradiator 27 under the control of the operation instruction device 6.

The bed 4 includes a bed main body 41 and a table 42. The lower part of the bed 4 is supported by the floor surface. The upper part of the bed main body 41 can move along the Y-axis direction with respect to the lower part, that is, perform a sliding motion under the control of the operation instruction device 6.

The table 42 is supported by the bed main body 41. The patient U can be placed on the table 42. The table 42 can move along the Y-axis direction, that is, perform a sliding motion by having the upper part of the bed main body 41 move along the Y-axis direction. The table 42 can also move along the X-axis direction and the Z-axis direction, that is, perform a sliding motion under the control of the operation instruction device 6. In addition, the table 42 can perform a rolling motion or a tilting motion under the control of the operation instruction device 6.

The surgery room display 5 is composed of a general display output device such as a liquid crystal display or an OLED (Organic Light Emitting Diode) display. The surgery room display 5 displays X-ray images such as fluoroscopic images and radiography images, and various information under the control of the processing circuitry 81. Note that the surgery room display 5 is an example of a display unit.

The operation instruction device 6 includes processing circuitry and memory (not shown). The operation instruction device 6 is a control circuit that sets conditions of X-ray imaging under the control of the medical data processing apparatus 8.

The surgery room input IF 7 includes: an input device that can be operated by staff members; and an input circuit that inputs signals from the input device. The input device is configured of, for example, a trackball, a switch, a mouse, a keyboard, a touch pad that enables input operations by touching an operation screen, or a touch screen in which a display screen and a touch pad are integrated, or by using a non-contact input device using an optical sensor, and a voice input device. When any one of the staff members manipulates the input device, the input circuit generates a signal corresponding to the manipulation and outputs the generated signal to the operation instruction device 6.

The medical data processing apparatus 8 is configured based on a computer, and is an apparatus that performs an operation control of the entire X-ray imaging apparatus 1 and image processing related to X-ray images acquired by the holder 2. The medical data processing apparatus 8 includes processing circuitry 81, a memory circuit 82, an X-ray image generating circuit 83, an X-ray image processing circuit 84, a control room display 85, and a control room input interface (hereinafter referred to as "control room input IF") 86.

The processing circuitry 81 refers to, processors such as a dedicated or general-purpose CPU (Central Processing Unit), MPU (Micro Processor Unit), or the like, as well as processing circuitry such as application specific integrated circuits (ASICs), and programmable logic devices. Examples of programmable logic devices include circuits such as SPLDs (Simple Programmable Logic Devices), CPLDs (Complex Programmable Logic Devices), and FPGAs. The processing circuitry 81 controls the operation of the operation instruction device 6 by reading and executing a program that is stored in the memory circuit 82 or directly incorporated in the processing circuitry 81, then realizes the function of performing imaging according to instructions, and then generates an X-ray image. Note that the processing circuitry 81 is an example of a processor.

The processing circuitry 81 may be configured by a single circuit or by combination of independent processing-circuit elements. In the latter case, the memory circuits 82 may be provided individually to store each program corresponding to the function of the processing-circuit elements or one memory circuit 82 may be provided to store all the programs corresponding to the functions of the processing-circuit elements.

Figure 3:
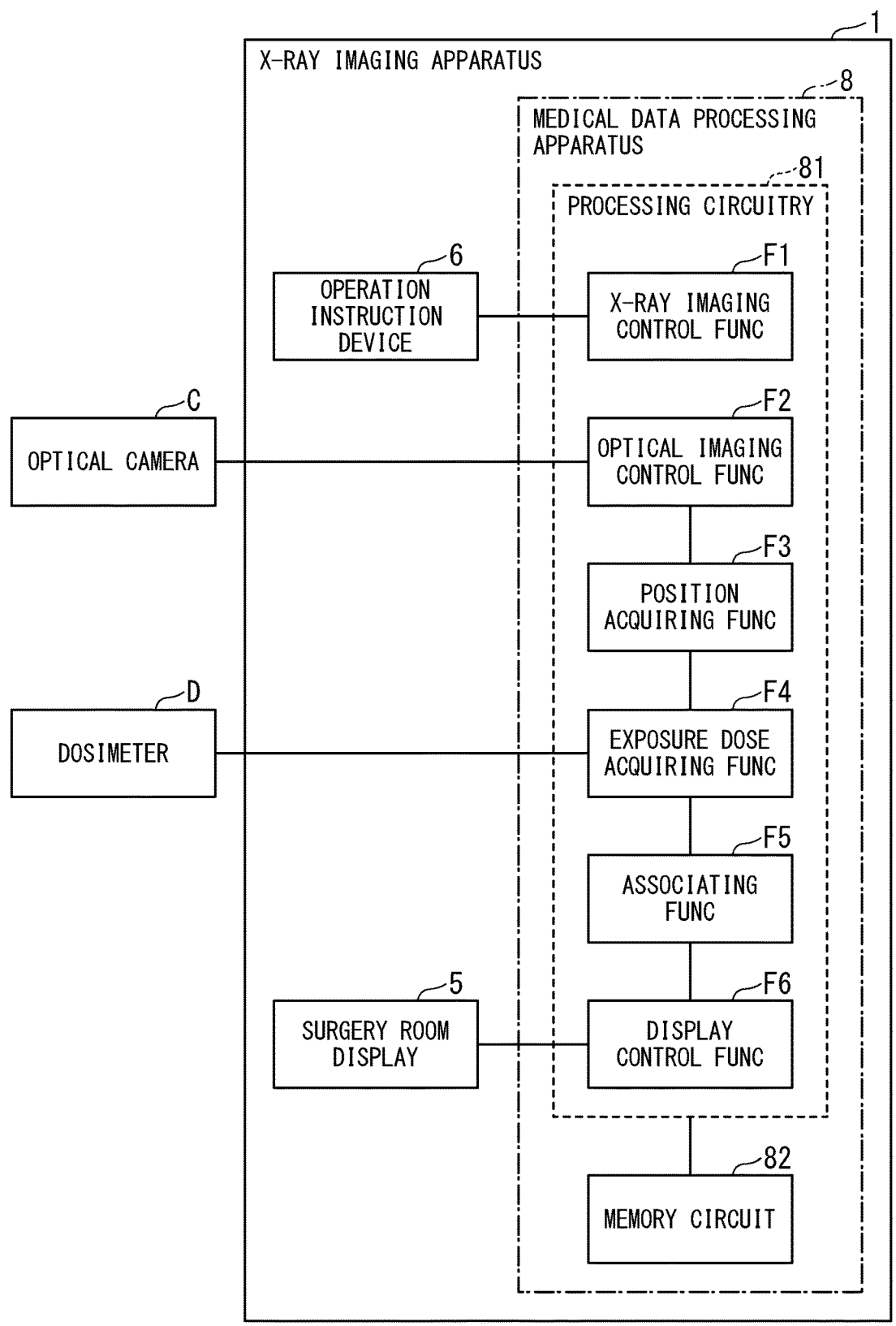
FIG. 3 is a block diagram showing functions of the X-ray imaging apparatus according to the embodiment.

The memory circuit 82 includes temporary recording media as well as non-transitory computer medium recording a computer program for realizing functions F1 to F6 described later with reference to FIGS. 3 and 10 are recorded.

The memory circuit 82 is composed of, for example, a hard disk, an optical disc, or a semiconductor memory element such as a RAM (Random Access Memory) and a flash memory. The memory circuit 82 may be composed of portable media such as a USB (Universal Serial Bus) memory and a DVD (Digital Video Disk). The memory circuit 82 stores various processing programs to be applied to the processing circuitry 81 (including not only application programs but also an OS (Operating System)), data necessary for executing the programs, and/or the X-ray image, for example. In addition, the OS may include GUI (Graphical User Interface) that makes extensive use of graphics when displaying information on the control room display 85 to an operator and allows basic operations to be performed through the control room input IF 86. Note that the memory circuit 82 is an example of a storage.

Under the control of the processing circuitry 81, the X-ray image generating circuit 83 performs logarithmic conversion processing (LOG processing) on the projection data output from the X-ray detector 28, performs addition on it processing as necessary, and generates X-ray image data. The X-ray image generating circuit 83 is an example of an X-ray image generator.

The X-ray image processing circuit 84 performs image processing on the X-ray image generated by the X-ray image generating circuit 83 under the control of the processing circuitry 81. Examples of image processing include enlargement/gradation/spatial filter processing on data, minimum/maximum value tracing processing on data accumulated in time series, and addition processing for removing noise. The data after image processing by the X-ray image processing circuit 84 is output to the surgery room display 5 (and/or the control room display 85) and stored in the memory circuit 82. The X-ray image processing circuit 84 is an example of an X-ray image processer.

The control room display 85 has a configuration equivalent to that of the surgery room display 5. The control room display 85 displays an X-ray image with characters or scales showing various parameters under the control of the processing circuitry 81.

The control room input IF 86 has a configuration equivalent to that of the surgery room input IF 7. The control room input IF 86 sends operation signals to the processing circuitry 81.

The optical camera C is a device for capturing an image and has an optical system (such as a lens) for forming an image. The optical camera C is installed in the surgery room at a position and angle that enables wide imaging of the surgery room. For example, the optical camera C is installed on the ceiling of the surgery room. The optical camera C outputs an optical image to the medical data processing apparatus 8 via the operation instruction device 6.

The dosimeter D (shown in FIG. 3) is a device for measuring the absorbed dose or exposure dose, which indicates the degree of X-ray irradiation, and acquiring dose data of the staff member who carries the dosimeter D. The dosimeter D can acquire dose data as an exposure dose [μSv/h], and can also acquire dose data as an integrated value [μSv].

Next, functions of the X-ray imaging apparatus 1 will be described with reference to FIG. 3. FIG. 3 is a block diagram showing functions of the X-ray imaging apparatus 1.

The processing circuitry 81 of the medical data processing apparatus 8 executes a computer program stored in the memory circuit 82 or directly incorporated in the processing circuitry 81, thereby realizing an X-ray imaging control function F1, an optical imaging control function F2, a position acquiring function F3, an exposure dose acquiring function F4, an associating function F5, and a display control function F6, as shown in FIG. 3. Though the functions F1 to F6 described below are like software implemented by executing a computer program, it is not limited to this case. All or part of the functions F1 to F6 may be realized by hardware such as ASIC. Further, all or part of the functions F1 to F6 of the processing circuitry 81 may be realized by the processing circuitry of the operation instruction device 6.

The X-ray imaging control function F1 includes a function of controlling the operation of the operation instruction device 6, the X-ray image generating circuit 83, the X-ray image processing circuit 84, and the like to execute X-ray imaging using the X-ray irradiator 27, thereby generating an X-ray image. The X-ray imaging control function F1 may include a function of storing the X-ray image in the memory circuit 82.

The optical imaging control function F2 includes a function of controlling the operation of the optical camera C to execute optical imaging, thereby acquiring an optical image showing the interior of the surgery room. The optical imaging control function F2 may include a function of storing the optical image in the memory circuit 82.

The position acquiring function F3 includes a function of sequentially acquiring a position of each staff member in the surgery room during the surgery on the patient U using the X-ray irradiator 27. Here, the staff members include doctors, technicians, nurses, record clerks, and the like.

The dose acquiring function F4 includes a function of sequentially acquiring the exposure dose of each staff member in the surgery room.

The associating function F5 includes a function of associating the position of each staff member acquired by the position acquiring function F3 and the exposure dose of each staff member acquired by the dose acquiring function F4 with a time, and sequentially recording such association data in the memory circuit 82. Note that the time may simply refer a timing, or may refer to the elapsed time from the start of X-ray irradiation emitted from the X-ray irradiator 27. In the following description, it is assumed that the time refers to the timing.

The display control function F6 includes a function of displaying association data indicating a relation between the position of each staff member and the exposure dose of each staff member in an identifiable manner on the surgery room display 5 (and/or the control room display 85). For example, the display control function F6 superimposes association data on the optical images sequentially acquired by the optical imaging control function F2 to sequentially generate superimposed images, and sequentially displays the generated images on the surgery room display 5. Alternatively, for example, the display control function F6 superimposes association data on the optical image previously acquired as a still image by the optical imaging control function F2 to sequentially generate superimposed images, and sequentially displays the generated images on the surgery room display 5.

Figure 4:
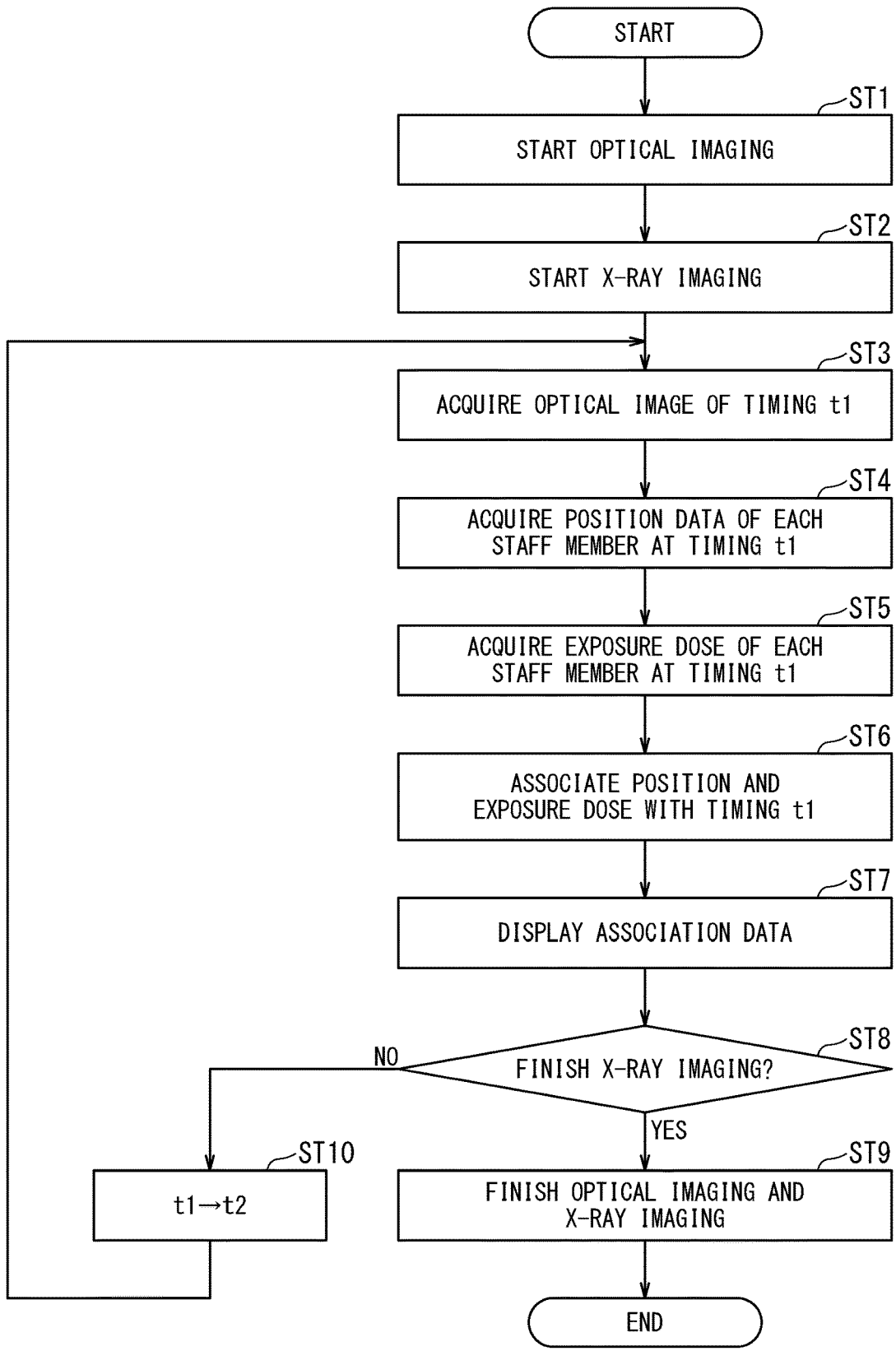
FIG. 4 is a diagram showing an operation of the X-ray imaging apparatus according to the embodiment as a flowchart.

Next, an operation of the X-ray imaging apparatus 1 will be described with reference to FIGS. 4 and 5. FIG. 4 is a diagram showing the operation of the X-ray imaging apparatus 1 as a flowchart. In FIG. 4, numerals attached to "ST" indicate respective steps of the flow chart.

First, the optical imaging control function F2 controls an operation of the optical camera C to start optical imaging, so as to start acquisition of an optical image showing the inside of the surgery room (step ST1). The X-ray imaging control function F1 controls an operation of the operation instruction device 6, the X-ray image generating circuit 83, the X-ray image processing circuit 84, and the like to start X-ray imaging using the X-ray irradiator 27, for example, fluoroscopy imaging, so as to start the generation of an X-ray image of patient U (step ST2). The optical imaging control function F2 acquires an optical image of time T (for example, at timing t1) from the optical camera C by optical imaging started in step ST1 (step ST3). The position acquiring function F3 acquires the position of each staff member in the surgery room at the timing t1 during the surgery on the patient U using the X-ray irradiator 27 (step ST4).

For example, in step ST4, the position acquiring function F3 acquires the position of each staff member in the surgery room based on the optical image at timing t1 acquired in step ST3. A case where the position of each staff member is acquired but not based on the optical image will be described in the first modification described later.

FIG. 5A is a diagram showing an example of the state where six staff members M are in the surgery room. As shown in FIG. 5A, there are a C-arm 26 that holds an X-ray irradiator 27, a bed 4, and six staff members M in the surgery room. FIG. 5B shows an optical image acquired by the optical camera C in the case of FIG. 5A. As shown in FIG. 5B, the position acquiring function F3 identifies the six staff members M who are present in the surgery room as the first to sixth staff members m1 to m6 based on the optical image. Here, the identification of the first to sixth staff members m1 to m6 based on the optical image is performed by the following method.

In the first method, a face data table is provided in which face data of the first to sixth staff members m1 to m6 is associated with the first to sixth staff members m1 to m6 (see FIG. 6). Then, the position acquiring function F3 refers to the face data table and performs face identification processing using the second optical image acquired from a second optical camera (not shown) which captures images of the entrance/exit of the surgery room. The position acquiring function F3 can identify the staff member M who entered the room through the entrance as one of the staff members m1 to m6 based on the optical image captured by the optical camera C. The staff members m1 to m6 as identified near the entrance based on the optical image will then enter the surgery room, and they can be tracked by the optical image of multiple frames thereafter.

Alternatively, in the second method, the position acquiring function F3 refers to the face data table and performs the face identification processing based on the third optical image acquired from a third optical camera (not shown) which captures an image of the inside of the surgery room from obliquely above such that the face can be identified. The position acquiring function F3 can identify the staff member M at the corresponding position on the optical image captured by the optical camera C as one of the staff members m1 to m6.

Alternatively, in the third method, the staff member M holds an IC card in which his/her own identification information (such as an ID) is registered over a card reader near the entrance. Then, the position acquiring function F3 can identify the staff member M near the entrance on the optical image as one of the staff members m1 to m6 corresponding to the identification information read by the card reader. The staff members m1 to m6 near the entrance as identified based on the optical image will then enter the surgery room, and they may be tracked by the optical image of multiple frames thereafter.

Then, the position acquiring function F3 acquires the position [X, Z] (positions [x1, z1] to [x6, z6]) in the optical image of the first to sixth staff members m1 to m6 as identified in the order of entry into the surgery room, as shown in FIG. 5B.

Returning to the description of FIG. 4, the dose acquiring function F4 acquires the exposure doses of the first to sixth staff members m1 to m6 (step ST5). The associating function F5 associates the position of the staff members m1 to m6 and the exposure doses of the staff members m1 to m6 with timing t1, and records such association data in the memory circuit 82 (step ST6).

In step ST6, the associating function F5 associates the positions [x1, z1] to [x6, z6] of the staff members m1 to m6 in the image and the exposure doses G (exposure doses g1, g2, . . . ) with timing t1, and records such association data. FIG. 5C shows positions [x1, z1] to [x6, z6] of the first to sixth staff members m1 to m6 and the exposure doses g1 to g6 associated with timing t1.

Here, the first to sixth staff members m1 to m6 each carry a dosimeter D (shown in FIG. 3). FIG. 7 is a diagram showing a dosimeter table. In the dosimeter table, the identification data d1 to d6 of the dosimeters D carried by the first to sixth staff members m1 to m6 are associated with the first to sixth staff members m1 to m6, respectively. The memory circuit 82 pre-stores the dosimeter table. The associating function F5 refers to the dosimeter table and associates the exposure dose acquired by the dosimeter D with the staff member corresponding to the identification data. For example, the associating function F5 refers to the dosimeter table and associates the exposure dose acquired by the dosimeter D, which is the identification data d1, with the first staff member m1 corresponding to the identification data d1.

In this way, the dose acquiring function F4 can acquire exposure doses at positions in the surgery room within movement ranges of the first to sixth staff members m1 to m6. Note that the dosimeters D may be installed in the main peripheral equipment provided in the surgery room or on the floor, wall, or ceiling of the surgery room. In this case, the dose acquiring function F4 can acquire exposure doses of the first to sixth staff members m1 to m6 even at positions outside the movement ranges, or at positions where the first to sixth staff members m1 to m6 do not often get close to in the surgery room.

Returning to the description of FIG. 4, the display control function F6 displays association data indicating a relation between the position of each staff member and the exposure dose in an identifiable manner on the surgery room display 5 (and/or the control room display 85) (step ST7).

Each of FIGS. 8A and 8B is a diagram showing a display example of association data. In FIG. 8A, the positions of the first to sixth staff members m1 to m6 in the optical image at timing t1 are visually classified according to the exposure dose. As shown in FIG. 8A, a range including the position [x3, z3] of the third staff member m3 and the position [x6, z6] of the sixth staff member m6 is set as an area Ev where the exposure dose is high based on the association performed in step ST6. A range including the position [x1, z1] of the first staff member m1 and the position [x4, z4] of the fourth staff member m4 is set as the area Ew where the exposure dose is low. The display control function F6 superimposes graphics indicating the areas Ev and Ew on the optical image, and display the superimposed image on the surgery room display 5. By this display, the radiation exposure awareness of the staff member M can be enhanced.

Note that the areas Ev and Ew may be represented by different colors. For example, the areas Ev and Ew are shown in different colors by changing at least one of hue, lightness, and saturation.

Returning to the description of FIG. 4, the X-ray imaging control function F1 determines whether or not to finish the X-ray imaging started in step ST2 (step ST8). If the determination in step ST8 is YES, that is, if it is determined to finish the X-ray imaging started in step ST2, the optical imaging control function F2 finishes the optical imaging started in step ST1, and the X-ray imaging control function F1 finishes the X-ray imaging started in step ST2 (step ST9).

On the other hand, if the determination in step ST8 is NO, that is, if it is determined not to finish the X-ray imaging started in step ST2, the X-ray imaging is continued, the time T is advanced from timing t1 to timing t2 (step ST10), and an optical image at timing t2 is acquired (step ST3).

In this way, by creating an environment in which the staff can instantly see their own exposure dose shown on the surgery room display 5, the staff member M can check their own exposure history and trends. In addition, the staff member M can tell the areas having higher exposure dose and lower exposure dose in the surgery room, and be aware of the area to stay so as to avoid large amount of radiation exposure. Furthermore, the exposure doses (numerical values) of the first to sixth staff members m1 to m6 may also be displayed on the screen of FIG. 8A or the exposure doses can be shown in different colors according to the exposure dose.

FIG. 8B visually represents the exposure doses of the first to sixth staff members m1 to m6 at timing t1. The display control function F6 displays a graph indicating the exposure dose associated in step ST6 on the surgery room display 5 as shown in FIG. 8B. The vertical bars which lengths corresponding to the exposure doses of the six staff members may be shown in different colors according to the lengths. For example, the vertical bars are shown in different colors by changing at least one of hue, lightness and saturation depending on each length. Note that the threshold of exposure dose may also be displayed.

According to the operation shown by the flowchart in FIG. 4, the superimposed image generated during the surgery can be displayed live during the surgery, and the superimposed image can also be played back after the surgery.

Note that the superimposed image shown in FIG. 8A and the superimposed image shown in FIG. 8B may be displayed on the same screen. Moreover, since the exposure dose, that is, the superimposed image is associated with the time T by the associating function F5, each staff member can also select the superimposed image to be displayed by the timing. In that case, the display control function F6 displays the superimposed image on which association data is superimposed on the surgery room display 5 based on the time T.

Each of FIGS. 9A and 9B is a diagram showing a display example of association data. As shown in each of FIGS. 9A and 9B, a superimposed image, a graph indicating the exposure dose, and a bar indicating time progress are displayed on the surgery room display 5. Further, the time at which the amount of change in the exposure dose (described in the fourth modification) is large is displayed on a bar in an identifiable manner (represented by "inverted triangle" in the figure).

For example, the bar is a seek bar. FIG. 9A is a display example when the superimposed image shown in FIG. 8A and the superimposed image shown in FIG. 8B are displayed live on the same screen. FIG. 9A shows a seek bar V indicating the time length from the start of X-ray imaging to the current timing. When each staff member selects a certain timing on the seek bar V via the surgery room input IF 7 (shown in FIG. 1), or moves the slider on the seek bar V to the left to a predetermined timing, a superimposed image showing the exposure dose at that timing is displayed above. Note that the exposure dose may be an integrated value. Further, the timing on the seek bar V may be associated with the time when the amount of change in the exposure dose (described in the fourth modification) is large (represented by "inverted triangle" in the figure).

FIG. 9B is a display example when the superimposed image shown in FIG. 8A and the superimposed image shown in FIG. 8B are played back on the same screen. FIG. 9B shows a seek bar V indicating the time length from the start of X-ray imaging to the finish of X-ray imaging. When the staff member M selects a certain timing on the seek bar V via the surgery room input IF 7 (shown in FIG. 1), or moves the slider on the seek bar V right and left to a desired timing, at least one of the superimposed image showing the exposure dose at that timing and the graph showing the exposure dose is displayed above.

Note that the functions F2 to F6 of the medical data processing apparatus 8, especially the functions F5 and F6, may be implemented by the second medical data processing apparatus (for example, a workstation) provided outside the X-ray imaging apparatus 1. In that case, the second medical data processing apparatus is communicably connected to the X-ray imaging apparatus 1 via a network, and data recorded during the surgery can be played back after the surgery.

As described above, according to the X-ray imaging apparatus 1 and the medical data processing apparatus 8, the positions [x1, z1] to [x6, z6] of the first to sixth staff members m1 to m6 in the surgery room and the exposure doses g1 to g6 are associated and recorded, thereby it is possible to display the exposure doses g1 to g6 of the first to sixth staff members m1 to m6 who are in the surgery room during the surgery. According to the X-ray imaging apparatus 1 and the medical data processing apparatus 8, the data recorded during the can be displayed live, or be played back after the surgery.

First Modification

As described above, in step ST4 shown in FIG. 4, the position acquiring function F3 acquires the position of each staff member in the surgery room based on the optical image acquired in step ST1. However, acquisition of the position of each staff member is not limited to that case. For example, position of each staff member may be acquired using a position sensor. This case will be explained.

FIG. 10 is a block diagram showing functions of the first modification of the X-ray imaging apparatus 1. As shown in FIG. 10, the same components as in FIG. 3 are denoted by the same reference numerals, and descriptions thereof are omitted.

The position acquiring function F3 associates a position acquired by the position sensor P with the staff member.

The position sensor P detects its own position, that is, a position [X, Z] of the staff member who carries the position sensor P. The position of the position sensor P is acquired using a multi-satellite positioning system (GNSS: Global Navigation Satellite System Profile), a global positioning system (GPS: Global Positioning Satellite), a magnetic field sensor, an image sensor such as Kinect (registered trademark), or a combination thereof. When multi-GNSS or GPS is used, the position sensor P receives signals transmitted by radio waves from multiple satellites and measures the transmission time. Thereby, the position of the position sensor P is acquired.

When the magnetic field sensor is used as the position sensor P, the magnetic field transmitter sequentially transmits three-axis magnetic fields, and the magnetic fields are received by the position sensor P. Thereby, the position of the position sensor P is acquired.

The memory circuit 82 stores a position table in advance. FIG. 11 is a diagram showing a position table where the identification data p1 to p6 of the position sensors P carried by the first to sixth staff members m1 to m6 are associated with the first to sixth staff members m1 to m6, respectively. The position acquiring function F3 refers to the position table and associates the position acquired by the position sensor with the staff member corresponding to the identification data. For example, the position acquiring function F3 refers to the position table and associates the position [x1, z1] acquired by the position sensor P with the first staff member m1 corresponding to the identification data p1.

The display control function F6 can display association data indicating a relation between the position of each staff member and the exposure dose in an identifiable manner on the surgery room display 5 as shown in FIGS. 8A and 8B. Note that FIG. 8A shows a case where a superimposed image is generated by superimposing a graphic indicating areas Ev and Ew on an optical image that is updated as time progresses. However, it is not limited to that case. In the first modification of the X-ray imaging apparatus 1, since the optical image is not used for acquiring the position, there is no need to sequentially acquire the optical image. Therefore, a superimposed image may be generated by displaying a graphic on the optical image as a still image acquired by imaging the interior of the surgery room when no staff is present. FIG. 12 shows a display example in that case. Unlike FIG. 8A, in the case shown in FIG. 12, the superimposed image does not include the stuff member, but the display shown in FIG. 12 has the same effect as the display in FIG. 8A.

As described above, according to the X-ray imaging apparatus 1 and the medical data processing apparatus 8, the positions [x1, z1] to [x6, z6] of the first to sixth staff members m1 to m6 in the surgery room and the exposure doses g1 to g6 are associated and recorded, thereby it is possible to display the exposure doses g1 to g6 of the first to sixth staff members m1 to m6 who are in the surgery room during the surgery.

Second Modification

The associating function F5 may output a live warning sound (e.g., buzzer, or alarm) from a speaker (not shown) of the medical data processing apparatus 8 under at least one of the following conditions: when the exposure dose reaches a threshold value or above in a certain period of time; when an integrated value of the exposure dose exceeds a threshold (which can be set arbitrarily); and when a position is in an area (for example, area Ev shown in FIG. 8) where an exposure dose equal to or greater than a threshold is expected. In that case, the display control function F6 may display a live warning sign on the surgery room display 5.

FIG. 13A is a diagram showing the movement of the sixth staff member m6 from timing t0 to timing t1. As shown in FIG. 13A, when the sixth staff member m6 who was outside the area Ev at timing t0 enters the area Ev at timing t1, the associating function F5 displays a warning sign on the surgery room display 5. FIG. 13B is a diagram showing an example of warning sign display.

When the sixth staff member m6 moves from outside the area Ev to inside the area Ev during the time from timing t0 to timing t1, the display control function F6 can display a warning sign as shown in FIG. 13B. For example, with respect to the sixth staff member m6, the display control function F6 displays a vertical bar indicating the exposure dose (low exposure dose) at timing t0 and a vertical bar indicating the exposure dose (high exposure dose) at timing t1 after the movement, and can display a warning sign by emphasizing the vertical bar indicating the exposure dose at timing t1. The display control function F6 may pop up a warning message "WARNING".

In addition to the warning sign display, the display control function F6 can provide information to the staff member regarding an area where the exposure dose is low by live-displaying the area on the surgery room display 5. In the memory circuit 82, positions [x1, z1] to [x6, z6] associated with exposure doses g1 to g6 are recorded as past data. Therefore, the display control function F6 can display an area including positions having low exposure dose. Furthermore, the display control function F6 may predict and display the exposure dose (distribution) of the irradiation area under the next X-ray irradiation condition (see the third modification described later) before the X-ray irradiation condition is switched. Based on this predicted distribution, it is possible to prompt the staff member in the area where the exposure dose is expected to be high to move to the area where the exposure dose is expected to be lower, and to provide information to the staff member on where to stand. As a method to predict exposure dose, scattered radiation prediction information based on X-ray irradiation conditions may also be used.

Third Modification

The associating function F5 can also associate the log of the irradiation data (for example, the imaging mode and the X-ray irradiation condition) with the time and record such association data in the memory circuit 82. In that case, the display control function F6 displays the exposure dose distribution based on the X-ray irradiation data on the surgery room display 5 (and/or the control room display 85). For example, the display control function F6 can display the exposure dose distribution based on the X-ray irradiation data using contour lines.

FIG. 14 is a diagram showing a history of irradiation data. The imaging mode indicated in the irradiation data refers to the imaging target "CARDIAC".

The X-ray irradiation conditions as irradiation data include the X-ray focal position [X, Y, Z] of the X-ray irradiator 27, the X-ray irradiation angle, the fluoroscopy imaging condition, the radiography imaging condition, and the like. The associating function F5 can acquire the X-ray focal position and the X-ray irradiation angle of the X-ray irradiator 27 based on encode information of a rotary encoder. The rotary encoder is attached to a roller (not shown) for moving the C-arm 26 (arc and rotational movement), or is attached to a roller (not shown) for moving the vertical axis rotation assembly 23 (or the suspension arm 24). The rotary encoder is a sensor which: converts the amount of mechanical displacement of the rotation of the rollers for moving the C-arm 26 and the like into electrical signals; processes the electrical signals; and detects encode information which is the basis of the positioning information. The acquisition of the X-ray focal position and the X-ray irradiation angle of the X-ray irradiator 27 is not limited to the case of using the rotary encoder. For example, the X-ray focal position and the X-ray irradiation angle of the X-ray irradiator 27 can also be acquired by a potentiometer, resolver, or the like.

The associating function F5 can acquire in advance the tube voltage and the tube current when the X-ray imaging is the fluoroscopy imaging, and can also acquire the time for the fluoroscopy imaging. Similarly, the associating function F5 can acquire in advance the tube voltage and tube current when X-ray imaging is the radiography imaging, and can also acquire the time for the radiography imaging. A new log will be generated when the X-ray irradiation conditions are changed during the surgery.

FIG. 15 is a diagram showing a display example of association data indicating the relation between the position of each staff member and the exposure dose of each staff member in the third modification of the X-ray imaging apparatus 1. As shown in FIG. 15, the display control function F6 can display the exposure dose distribution using contour lines based on the X-ray irradiation data.

As described above, according to the X-ray imaging apparatus 1 and the medical data processing apparatus 8, the positions [x1, z1] to [x6, z6] of the first to sixth staff members m1 to m6 in the surgery room and the distribution of the exposure doses g1 to g6 are associated and recorded, thereby it is possible to display the distribution of the exposure doses g1 to g6 of the first to sixth staff members m1 to m6 who are in the surgery room during the surgery.

Fourth Modification

The dose acquiring function F4 may acquire the amount of change in the exposure dose based on an optical image set consisting of multiple optical images captured by the optical camera C. The dose acquiring function F4 may directly acquire the amount of change in the exposure dose based on the optical image set, or may generate motion data based on the optical image set, and then acquire the amount of change in the exposure dose based on the motion data. The motion data means data indicating movements of the staff member M in the surgery room and motions of hands of the staff members such as picking up an object like medicine. A case will be described below in which the dose acquiring function F4 primarily generates motion data based on the optical image set (FIGS. 16 and 17 to be described later), and secondarily acquires the amount of change in the exposure dose based on the motion data (FIGS. 18 and 19 to be described later).

In the processing of generating the motion data based on the optical image set, for example, a lookup table (LUT) that associates the optical image set and the motion data may be used. Machine learning may also be used for this processing. As machine learning, deep learning using multilayer neural networks such as CNN (convolutional neural network) and CDBN (convolutional deep belief network) may be used.

Here, an example is shown where the dose acquiring function F4 includes a neural network Na and uses deep learning to generate motion data based on an optical image set. That is, the dose acquiring function F4 generates motion data of the staff member M by sequentially inputting the optical image sets of the surgery room to the learned model meant for generating the motion data based on the optical image set.

FIG. 16 is an explanatory diagram showing an example of data flow during learning.

The dose acquiring function F4 sequentially updates the parameter data Pa by learning using a large number of input training data. The training data consists of optical image sets E1, E2, E3, . . . as input training data and multiple motion data F1, F2, F3, . . . . The optical image sets E1, E2, E3, . . . constitute the input training data group E. The multiple motion data F1, F2, F3, . . . constitutes a output training data group F. Each of the multiple motion data F1, F2, F3, . . . is preferably motion data related to the corresponding optical image set E1, E2, E3, . . . .

The dose acquiring function F4 sequentially updates the parameter data Pa each time training data is input such that the result of processing the optical image sets E1, E2, E3, . . . by the neural network Na approaches the multiple motion data F1, F2, F3, . . . . That is, the so-called learning is performed. In general, when the change rate of the parameter data Pa converges within a threshold, learning is determined to be finished. Hereinafter, the parameter data Pa after learning will be particularly referred to as learned parameter data Pa'. Note that the type of input training data should coincide with the type of input data during operation shown in FIG. 16.

FIG. 17 is an explanatory diagram showing an example of a data flow during operation.

During operation, the dose acquiring function F4 inputs the optical image set E', for example, an optical image set E' of timing t1 to timing t50, and outputs motion data using the learned parameter data Pa'.

The neural network Na and the learned parameter data Pa' constitute a learned model 100. The neural network Na is stored in memory circuit 82 in the form of a program. The learned parameter data Pa' may be stored in the memory circuit 82, or may be stored in a storage medium connected to the X-ray imaging apparatus 1 via a network (not shown). In this case, the exposure dose acquiring function F4 realized by the processor of the processing circuitry 81 reads the learned model 100 from the memory circuit 82 and executes it to generate motion data F' based on the optical image set E'. Note that the learned model 100 may be constructed by an integrated circuit such as ASIC or FPGA.

The dose exposure acquiring function F4 acquires the amount of change in the exposure dose of the staff member M based on the motion data of the staff member M.

FIG. 18 is an explanatory diagram showing an example of data flow during learning.

The exposure dose acquiring function F4 sequentially updates the parameter data Pb by learning using a large number of input training data. The training data consists of multiple motion data F1, F2, F3, . . . as input training data and amount of change G1, G2, G3, . . . in the exposure dose. The multiple motion data F1, F2, F3, . . . constitutes input training data group F. The amount of change G1, G2, G3, . . . in the exposure dose constitute an output training data group G. The amount of change G1, G2, G3, . . . in the exposure dose are preferably amount of change in the exposure dose related to the corresponding multiple motion data F1, F2, F3, . . . respectively.

The exposure dose acquiring function F4 sequentially updates the parameter data Pb each time training data is input such that the result of processing the multiple motion data F1, F2, F3, . . . by the neural network Nb approaches the amount of change G1, G2, G3, . . . in the exposure dose. That is, the so-called learning is performed.

FIG. 19 is an explanatory diagram showing an example of a data flow during operation.

During operation, the dose acquiring function F4 inputs the motion data F' and outputs the amount of change in the exposure dose using the learned parameter data Pb'.

The neural network Nb and the leaned parameter data Pb' constitute the learned model 101. The neural network Nb is stored in memory circuit 82 in the form of a program. The learned parameter data Pb' may be stored in the memory circuit 82, or may be stored in a storage medium connected to the X-ray imaging apparatus 1 via a network (not shown). In this case, the dose acquiring function F4 realized by the processor of the processing circuitry 81 reads the learned model 101 from the memory circuit 82 and executes it so as to acquire an amount of change G' in the exposure dose based on the motion data F'. Note that the learned model 101 may be constructed by an integrated circuit such as ASIC or FPGA.

In this way, the dose acquiring function F4 acquires the amount of change in the exposure dose based on the output of the learned model which has learned the relation between the motion data of the staff member M and the amount of change in the exposure dose of the staff member M. Then, the display control function F6 display the amount of change in the exposure dose corresponding to the position of the staff member M on the surgery room display 5 (and/or the control room display 85).

As described above, according to the fourth modification of the X-ray imaging apparatus 1 and the medical data processing apparatus 8, it is possible to provide information on a motion resulting in a large amount of change in the exposure dose, the motion being of the first to sixth staff members m1 to m6 in the surgery room.

According to at least one embodiment described above, it is possible to display the exposure dose corresponding to the position of each medical staff member in the surgery room during the surgery.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, changes, and combinations of embodiments in the form of the methods and systems described herein may be made without departing from the spirit of the inventions. The accompanying claims and their equivalents are intended to cover such forms or modifications as would fall within the scope and spirit of the inventions.

What is claimed is:

1. An X-ray imaging apparatus, comprising:
an X-ray irradiator placed in a surgery room; and
processing circuitry configured to
sequentially acquire a position of each staff member present in the surgery room during a procedure using the X-ray irradiator,
sequentially acquire an exposure dose of each staff member from a dosimeter,
associate the position of each staff member and the exposure dose of each staff member with a time, and sequentially record association data in a memory circuit,
sequentially display the association data, which indicates a relation between the position of each staff member and the exposure dose of each staff member in an identifiable manner on a display,
classify an area having a high exposure dose and an area having a low exposure dose,
sequentially superimpose graphics indicating the high exposure dose area and the low exposure dose area on an acquired optical image of the surgery room to generate a superimposed image, and
sequentially display the superimposed image on the display.

2. The X-ray imaging apparatus according to claim 1, further comprising:
the memory circuit, which is configured to store a dosimeter table in which each staff member is associated with identification data of a corresponding dosimeter carried by each staff member, wherein
the processing circuitry is further configured to refer to the dosimeter table and to associate an exposure dose acquired by the corresponding dosimeter with each staff member corresponding to the identification data.

3. The X-ray imaging apparatus according to claim 2, wherein the processing circuitry is further configured to:
control an operation of an optical camera that images an inside of the surgery room to perform an optical imaging, so as to sequentially acquire optical images showing the inside of the surgery room, and
sequentially acquire the position of each staff member in the optical image.

4. The X-ray imaging apparatus according to claim 2, wherein
the memory circuit is further configured to store a position table in which each staff member is associated with identification data of a corresponding position sensor carried by each staff member, and
the processing circuitry is further configured to refer to the position table and to associate the position acquired by the corresponding position sensor with the staff member corresponding to the identification data.

5. The X-ray imaging apparatus according to claim 1, wherein the processing circuitry is further configured to:
display the superimposed image, a graph indicating the exposure dose, and a bar indicating time progress on the display, and
display a timing when an amount of change in the exposure dose is large on the bar in an identifiable manner.

6. The X-ray imaging apparatus according to claim 5, wherein the processing circuitry is further configured to display, when receiving a selection of a timing when the amount of change in the exposure dose is large as displayed on the bar, a superimposed image corresponding to a selected timing and a graph showing the exposure dose on the display.

7. The X-ray imaging apparatus according to claim 1, wherein the processing circuitry is configured to further display a graph indicating the exposure dose.

8. The X-ray imaging apparatus according to claim 1, wherein the processing circuitry is further configured to sequentially display the association data based on the time on the display.

9. The X-ray imaging apparatus according to claim 1, wherein the processing circuitry is further configured to display a warning sign under at least one of the following conditions:
when the exposure dose reaches a first threshold value or above in a certain period of time;
when an integrated value of the exposure dose exceeds a second threshold value; and
when a position is in an area where an exposure dose equal to or greater than a third threshold value is expected.

10. The X-ray imaging apparatus according to claim 1, wherein the processing circuitry is further configured to:
associate the time with X-ray irradiation data and record the association data in the memory circuit, and
display an exposure dose distribution based on the X-ray irradiation data.

11. The X-ray imaging apparatus according to claim 1, wherein the processing circuitry is further configured to acquire motion data of each staff member based on an output of a learned model that has learned a relation between an optical image acquired by imaging the surgery room and the motion data of the staff members.

12. The X-ray imaging apparatus according to claim 11, wherein the processing circuitry is further configured to:
acquire an amount of change in the exposure dose based on an output of a learned model that has learned a relation between the motion data of each staff member and the amount of change in the exposure dose, and
display the amount of change in the acquired exposure dose corresponding to the position of each staff member.

13. The X-ray imaging apparatus according to claim 1, wherein the processing circuitry is further configured to:
acquire an amount of change in the exposure dose based on an output of a learned model that has learned a relation between the motion data of each staff member and the amount of change in the exposure dose, and
display the amount of change in the acquired exposure dose corresponding to the position of each staff member.

14. A medical data processing apparatus, comprising:
processing circuitry configured to
sequentially acquire a position of each staff member present in a surgery room during a procedure using an X-ray irradiator,
sequentially acquire an exposure dose of each staff member from a dosimeter,
associate the position of each staff member and the exposure dose of each staff member with a time, and sequentially record association data in a memory circuit, sequentially display the association data, which indicates a relation between the position of each staff member and the exposure dose of each staff member in an identifiable manner on a display, classify an area having a high exposure dose and an area having a low exposure dose, sequentially superimpose graphics indicating the high exposure dose area and the low exposure dose area on an acquired optical image of the surgery room to generate a superimposed image, and sequentially display the superimposed image on the display.

15. The medical data processing apparatus according to claim 14, further comprising:

the memory circuit, which is configured to store a dosimeter table in which each staff member is associated with identification data of a corresponding dosimeter carried by each staff member, wherein the processing circuitry is further configured to refer to the dosimeter table and to associate an exposure dose acquired by the corresponding dosimeter with each staff member corresponding to the identification data.

16. The medical data processing apparatus according to claim 14, wherein the processing circuitry is further configured to:

control an operation of an optical camera that images an inside of the surgery room to perform an optical imaging, so as to sequentially acquire optical images showing the inside of the surgery room, and sequentially acquire the position of each staff member in the optical image.

17. The medical data processing apparatus according to claim 15, wherein the processing circuitry is configured to further display a graph indicating the exposure dose.

18. The medical data processing apparatus according to claim 14, wherein the processing circuitry is configured to sequentially display the association data based on the time on the display.

19. A non-transitory computer-readable medium storing a computer program for causing a computer to execute processing comprising:

sequentially acquiring a position of each staff member present in a surgery room during a procedure using an X-ray irradiator;

sequentially acquiring an exposure dose of each staff member from a dosimeter;

associating the position of each staff member and the exposure dose of each staff member with a time;

sequentially recording association data in a memory circuit;

sequentially displaying the association data, which indicates a relationship between the position of each staff member and the exposure dose of each staff member in an identifiable manner on a display, classifying an area having a high exposure dose and an area having a low exposure dose, sequentially superimposing graphics indicating the high exposure dose area and the low exposure dose area on an acquired optical image of the surgery room to generate a superimposed image, and sequentially displaying the superimposed image on the display.

* * * * *